(12) United States Patent
Yuan et al.

(10) Patent No.: US 11,868,463 B2
(45) Date of Patent: Jan. 9, 2024

(54) METHOD FOR MANAGING APPLICATION PERMISSION AND ELECTRONIC DEVICE

(71) Applicant: Huawei Technologies Co., Ltd., Shenzhen (CN)

(72) Inventors: Zhongju Yuan, Shenzhen (CN); Manhai Yao, Shanghai (CN); Haitao Long, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 215 days.

(21) Appl. No.: 17/296,907

(22) PCT Filed: Jan. 23, 2019

(86) PCT No.: PCT/CN2019/072804
§ 371 (c)(1),
(2) Date: May 25, 2021

(87) PCT Pub. No.: WO2020/150917
PCT Pub. Date: Jul. 30, 2020

(65) Prior Publication Data
US 2021/0390171 A1    Dec. 16, 2021

(51) Int. Cl.
*G06F 21/00*  (2013.01)
*G06F 21/51*  (2013.01)

(52) U.S. Cl.
CPC ........ *G06F 21/51* (2013.01); *G06F 2221/033* (2013.01)

(58) Field of Classification Search
CPC .. G06F 21/51; G06F 2221/033; G06F 21/604; G06F 9/451; G06F 21/629; G06F 21/12; G06F 21/53; G06F 2221/2141
See application file for complete search history.

(56) References Cited

U.S. PATENT DOCUMENTS

2008/0022396 A1    1/2008 Kado
2013/0347096 A1    12/2013 Lee
(Continued)

FOREIGN PATENT DOCUMENTS

CN    101082886 A    12/2007
CN    103905651 A    7/2014
(Continued)

OTHER PUBLICATIONS

Arrows life, "A new style of SMS! Lets use " +Message" (Part 3)," Dec. 7, 2018, 22 pages (with an English translation).
(Continued)

*Primary Examiner* — Ghazal B Shehni
(74) *Attorney, Agent, or Firm* — Conley Rose, P.C.

(57) ABSTRACT

A method for managing an application permission and an electronic device includes an electronic device that displays a home screen, where the home screen includes an icon of a first application. In response to a first operation from the user on the icon, the electronic device displays a first interface, and when displaying the first interface, the electronic device allows the first application to use a first application permission. In response to a second operation of the user on the first interface, the electronic device displays a second interface, and when displaying the second interface, the electronic device rejects the first application to use the first application permission.

20 Claims, 29 Drawing Sheets

(56) References Cited

U.S. PATENT DOCUMENTS

| | | | |
|---|---|---|---|
| 2016/0191534 A1 | 6/2016 | Mallozzi | |
| 2016/0205115 A1 | 7/2016 | Kulkarni et al. | |
| 2017/0012982 A1* | 1/2017 | Carter | G06F 21/556 |
| 2017/0076099 A1 | 3/2017 | Yao et al. | |
| 2019/0065711 A1* | 2/2019 | Seo | G06F 9/451 |

FOREIGN PATENT DOCUMENTS

| | | | |
|---|---|---|---|
| CN | 105205388 A | 12/2015 | |
| CN | 106446614 A | 2/2017 | |
| CN | 106529270 A | 3/2017 | |
| EP | 3040899 A1 | 7/2016 | |
| JP | 2018508857 A | 3/2018 | |
| WO | 2018068868 A1 | 4/2018 | |

OTHER PUBLICATIONS

Memorva, "iPhone privacy settings This app does not have access to your photos and videos," Sep. 16, 2018, 6 pages (with an English translation).

@IT, "Part 6 Android device location information / GPS setting technique to avoid getting lost," Oct. 23, 2013, 24 pages (with an English translation).

ITU-T H.264, Apr. 2017, "Series H: Audiovisual and Multimedia Systems, Infrastructure of audiovisual services-Coding of moving video, Advanced video coding for generic audiovisual services," 812 pages.

* cited by examiner

Reading scenario

METHOD FOR MANAGING APPLICATION PERMISSION AND ELECTRONIC DEVICE

CROSS-REFERENCE TO RELATED APPLICATIONS

This application is a U.S. National Stage of International Patent Application No. PCT/CN2019/072804 filed on Jan. 23, 2019, which is hereby incorporated by reference in its entirety.

TECHNICAL FIELD

This application relates to the field of terminal technologies, and in particular, to a method for managing an application permission and an electronic device.

BACKGROUND

Currently, when an application is installed or used in a mobile phone, a user needs to pre-grant one or more application permissions that are allowed to be used by the application. For example, the application permission may include reading contact information, obtaining location information, reading calendar information, enabling a recording function, and invoking a camera.

For example, if the user grants, to a browser application during installation of the browser application, an application permission to invoke a camera, the mobile phone may record that invoking the camera is a registered permission of the browser application. Subsequently, if it is detected that the browser application requests to open the camera of the mobile phone, because invoking the camera is the registered permission of the browser application, the mobile phone may respond to the request of the browser application to open the camera for shooting. However, if an application abuses an application permission after registering the application permission, resource overheads of the mobile phone are increased, and a risk of user privacy leakage is also increased.

SUMMARY

This application provides a method for managing an application permission and an electronic device, to allow an application to use different application permissions in different use scenarios. This reduces a security risk of user privacy leakage, and improves user experience.

To achieve the foregoing objective, the following technical solutions are used in this application.

According to a first aspect, this application provides a method for managing an application permission, including: An electronic device displays a home screen, where the home screen includes an icon of a first application; in response to a first operation that a user taps the icon, the electronic device may display a first interface; when displaying the first interface, the electronic device may allow the first application to use a first application permission; in response to a second operation of the user on the first interface, the electronic device may display a second interface; and when displaying the second interface, the electronic device may reject the first application to use the first application permission.

In other words, when running the first application, the electronic device may allow or reject, with reference to a currently displayed interface, the first application to use an application permission, instead of allowing the application to randomly use an application permission after granting the application permission to the application, to reduce system resource consumption and a security risk of user privacy leakage, and improve user experience.

In a possible implementation, a use scenario indicated by the first interface is a first scenario, and a use scenario indicated by the second interface is a second scenario. That the electronic device allows the first application to use a first application permission includes: When the first application permission corresponds to the first scenario, the electronic device allows the first application to use the first application permission. That the electronic device rejects the first application to use the first application permission includes: When the first application permission does not correspond to the second scenario, the electronic device rejects the first application to use the first application permission.

In other words, when the application applies to the electronic device for using an application permission, the electronic device may determine, with reference to a current specific use scenario, whether to grant the application permission to the application. If an application permission applied for and used by the application corresponds to a current use scenario, it indicates that using the application permission in the current use scenario is proper. In this case, the electronic device may grant the application to continue to use the application permission, to avoid affecting normal use of various functions provided by the application by the user.

If an application permission applied for by the application does not correspond to a current use scenario, it indicates that it is improper to use the application permission in the current use scenario. If the application continues to be allowed to use the application permission, unnecessary system resources are consumed when the application uses the application permission, which increases power consumption overheads. In addition, after the application is allowed to use the application permission that does not correspond to the current use scenario, the application may further abuse the application permission to obtain user privacy, which increases a risk of user privacy leakage. Therefore, if the application permission applied for and used by the application this time does not correspond to the current use scenario, the electronic device may reject to grant the application to use the application permission this time, to reduce system resource consumption and a security risk of user privacy leakage, and improve user experience.

In a possible implementation, when the electronic device rejects the first application to use the first application permission, the method further includes: The electronic device displays a first notification in the second interface, where the first notification is used to prompt the user that a request for using the first application permission by the first application this time is rejected.

For example, the first notification may include the use scenario corresponding to the second interface.

In a possible implementation, after the electronic device displays a first notification in the second interface, the method further includes: If the electronic device detects that the user opens the first notification, the electronic device displays a settings interface for managing an application permission. The user can manually manage application permissions in the settings interface.

In a possible implementation, when the second interface is displayed, the method further includes: If the electronic device detects that the first application applies for using the first application permission, the electronic device may display a dialog box in the second interface, where the dialog box includes a first button that does not allow the first application to use the first application permission; and that the electronic device rejects the first application to use the first application permission includes: If the electronic device detects that the user selects the first button, the electronic device rejects the first application to use the first application permission. In other words, when the electronic device detects that there is a security risk in allowing the application to use the first application permission in the second interface, the electronic device may prompt the user to manually select to allow or reject the application to use the first application permission this time.

In a possible implementation, the dialog box may further include prompt information. The prompt information is used to prompt the user with a security risk of allowing the first application to use the first application permission, so that the user learns a security risk after the first application is allowed to use the first application permission this time.

In a possible implementation, the dialog box may further include a second button that allows the first application to use the first application permission, and after the electronic device displays a dialog box in the second interface, the method further includes: If the electronic device detects that the user selects the second button, the electronic device provides fake data to the first application when the first application uses the first application permission this time. In other words, although the user allows the first application to use the first application permission, user data finally obtained by the first application is not real user data, so that the first application is prevented from abusing the first application permission to obtain user privacy.

In a possible implementation, that the electronic device rejects the first application to use the first application permission includes: A permission service in the electronic device sends a permission rejection response to the first application, so that the first application cannot use the first application permission.

Alternatively, that the electronic device rejects the first application to use the first application permission includes: The electronic device allows the first application to use the first application permission; and the electronic device provides the fake data to the first application when the first application uses the first application permission. In this way, after the electronic device allows the first application to use the first application permission, a case in which the first application cannot run normally, such as an unexpected exit, may be avoided after the first application obtains the permission rejection response. In addition, that the electronic device provides the fake data to the first application can protect real data of the user from being leaked by the first application.

For example, after the electronic device provides the fake data to the first application when the first application uses the first application permission, the method further includes: The electronic device displays a second notification in the second interface, where the second notification is used to prompt the user that user data obtained when the first application uses the first application permission this time is the fake data.

In a possible implementation, when the second interface is displayed, although the electronic device rejects the first application to use the first application permission, the electronic device may allow the first application to use a second application permission (the second application permission is different from the first application permission). In other words, in a scenario corresponding to a same interface, the electronic device may grant the first application to use some application permissions, and the electronic device may reject the first application to use other application permissions.

In a possible implementation, when the first application is installed, if the electronic device detects that the first application requests to register the first application permission, the electronic device may determine whether the first application permission corresponds to a type of the first application. If the first application permission corresponds to the type of the first application, the electronic device grants the first application to register the first application permission. In other words, when an application registers an application permission in the electronic device, the electronic device may shield, for the user, some application permissions that do not correspond to an application type of the application, to avoid a security problem such as privacy leakage that is caused because the application subsequently uses the application permissions to obtain user privacy.

For example, the first application permission may include: a permission to obtain location information, a permission to read/modify an address book, a permission to read/modify a calendar, a permission to use a camera, a permission to use a microphone, a permission to use Bluetooth, or a permission to use a voice recognition function.

According to a second aspect, this application provides an electronic device, including a touchscreen, where the touchscreen includes a touch-sensitive surface and a display; one or more processors; one or more memories; and one or more computer programs. The processors are coupled to both the memories and the touchscreen. The one or more computer programs are stored in the memories. When the electronic device runs, the processor executes the one or more computer programs stored in the memories, so that the electronic device performs the method for managing an application permission according to any one of the implementations of the first aspect.

According to a third aspect, this application provides a computer storage medium, including computer instructions. When the computer instructions are run on an electronic device, the electronic device is enabled to perform the method for managing an application permission according to any one of the implementations of the first aspect.

According to a fourth aspect, this application provides a computer program product. When the computer program product is run on an electronic device, the electronic device is enabled to perform the method for managing an application permission according to any one of the implementations of the first aspect.

It may be understood that, the electronic device in the second aspect, the computer storage medium in the third aspect, and the computer program product in the fourth aspect that are provided above are all configured to perform the corresponding method provided above. Therefore, for beneficial effects that can be achieved by the electronic device, the computer storage medium, and the computer program product, refer to beneficial effects in the corresponding method provided above. Details are not described again herein.

DESCRIPTION OF EMBODIMENTS

The following describes implementations of the embodiments in detail with reference to the accompanying drawings.

A method for managing an application permission provided in the embodiments of this application may be applied to an electronic device such as a mobile phone, a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), a wearable electronic device, or a virtual reality device. This is not limited in the embodiments of this application.

Figure 1:
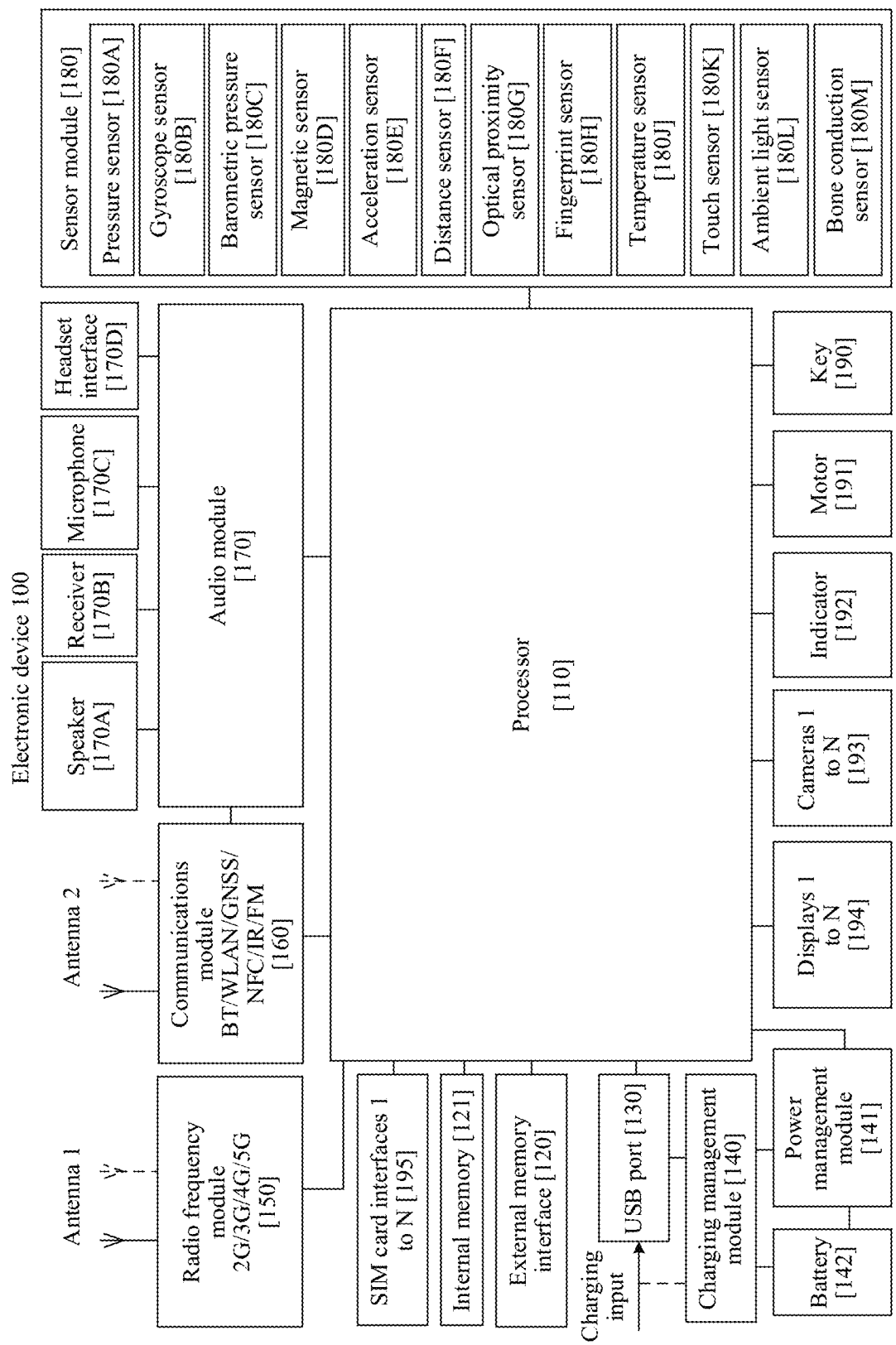
FIG. 1 is a schematic structural diagram 1 of an electronic device according to an embodiment of this application.

For example, FIG. 1 is a schematic structural diagram of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a radio frequency module 150, a communications module 160, an audio module 170, a speaker 170A, a receiver 170B, a microphone 170C, a headset interface 170D, a sensor module 180, a key 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store an instruction and data. In some embodiments, the memory in the processor 110 is a high-speed cache memory. The memory may store an instruction or data just used or cyclically used by the processor 110. If the processor 110 needs to use the instruction or the data again, the processor 110 may directly invoke the instruction or the data from the memory. This avoids repeated access and reduces waiting time of the processor 110, to improve system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/ transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the communications module 160 through the I2S interface, to implement a function of answering a call by using a Bluetooth headset.

The PCM interface may also be used for audio communication, to sample, quantize, and encode an analog signal. In some embodiments, the audio module 170 may be coupled to the communications module 160 through a PCM bus interface. In some embodiments, the audio module 170 may also transmit an audio signal to the communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 and the communications module 160. For example, the processor 110 communicates with a Bluetooth module in the communications module 160 through the UART interface, to implement a Bluetooth function. In some embodiments, the audio module 170 may transmit an audio signal to the communications module 160 through the UART interface, to implement a function of playing music by using a Bluetooth headset.

The MIPI interface may be configured to connect the processor 110 to peripheral devices such as the display 194 and the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured through software. The GPIO interface may be configured as a control signal or a data signal. In some embodiments, the GPIO interface may be configured to connect the processor 110 and the camera 193, the display 194, the communications module 160, the audio module 170, the sensor module 180, or the like. The GPIO interface may alternatively be configured as an I2C interface, an I2S interface, a UART interface, an MIPI interface, or the like.

The USB port 130 is an interface that conforms to a USB standard specification, and may be specifically a mini USB port, a micro USB port, a USB Type-C interface, or the like. The USB port 130 may be configured to connect to a charger to charge the electronic device 100, may be configured to transmit data between the electronic device 100 and a peripheral device, or may be configured to connect to a headset to play audio by using the headset. Alternatively, the interface may be configured to connect to another electronic device, for example, an AR device.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from an interface connection manner in the foregoing embodiment, or use a combination of a plurality of interface connection manners.

The charging management module 140 is configured to receive charging input from the charger. The charger may be a wireless charger or a wired charger. In some embodiments of wired charging, the charging management module 140 may receive charging input from the wired charger through the USB port 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect the battery 142 and the charging management module 140 to the processor 110. The power management module 141 receives input of the battery 142 and/or the charging management module 140, and supplies power to the processor 110, the internal memory 121, an external memory, the display 194, the camera 193, the communications module 160, and the like. The power management module 141 may further be configured to monitor parameters such as a battery capacity, battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by the antenna 1, the antenna 2, the radio frequency module 150, the communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The radio frequency module 150 may provide a solution that is applied to the electronic device 100 and that includes wireless communications technologies such as 2G, 3G, 4G, and 5G. The radio frequency module 150 may include at least one filter, a switch, a power amplifier, a low noise amplifier (low noise amplifier, LNA), and the like. The radio frequency module 150 may receive an electromagnetic wave by using the antenna 1, perform processing such as filtering or amplification on the received electromagnetic wave, and transfer the electromagnetic wave to the modem processor for demodulation. The radio frequency module 150 may further amplify a signal modulated by the modem processor, and convert the signal into an electromagnetic wave for radiation by using the antenna 1. In some embodiments, at least some functional modules in the radio frequency module 150 may be disposed in the processor 110. In some embodiments, at least some functional modules in the radio frequency module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (not limited to the speaker 170A, the receiver 170B, and the like), or displays an image or a video by using the display 194. In some embodiments, the modem processor may be an independent component. In some other embodiments, the modem processor may be independent of the processor 110, and is disposed in a same component as the radio frequency module 150 or another functional module.

The communications module 160 may provide a wireless communication solution that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device 100. The communications module 160 may be one or more devices integrating at least one communications processor module. The communications module 160 receives an electromagnetic wave by using the antenna 2, performs frequency modulation and filtering processing on an electromagnetic wave signal, and sends a processed signal to the processor 110. The communications module 160 may further receive a to-be-sent signal from the processor 110, perform frequency modulation and amplification on the signal, and convert the signal into an electromagnetic wave for radiation by using the antenna 2.

In some embodiments, the antenna 1 of the electronic device 100 is coupled to the radio frequency module 150, and the antenna 2 is coupled to the communications module 160, so that the electronic device 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is a microprocessor for image processing, and connects the display 194 to the application processor. The GPU is configured to: perform mathematical and geometric calculation, and render an image. The processor 110 may include one or more GPUs that execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a miniled, a microLed, a microoLed, quantum dot light emitting diodes (quantum dot light emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more types of video codecs. In this way, the electronic device 100 can play or record videos in a plurality of encoding formats, for example, moving picture experts group (moving picture experts group, MPEG)1, MPEG2, MPEG3, MPEG4, and the like.

The NPU is a neural-network (neural-network, NN) computing processor, quickly processes input information by referring to a structure of a biological neural network, for example, by referring to a transfer mode between human brain neurons, and may further continuously perform self-learning. The NPU may implement applications such as intelligent cognition of the electronic device 100, for example, image recognition, facial recognition, speech recognition, text comprehension, and the like.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes an instruction. The processor 110 runs the instruction stored in the internal memory 121 to perform various function applications of the electronic device 100 and process data. The internal memory 121 may include a program storage area and a data storage area. The program storage area may store an operating system, an application required by at least one function (for example, a sound playing function or an image playing function), and the like. The data storage area may store data (for example, audio data, a phone book, and the like) created in a process of using the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement audio functions, for example, music playing and recording, by using the audio module 170, the speaker 170A, the receiver 170B, the microphone 170C, the headset interface 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When the electronic device 100 is configured to answer a call or listen to voice information, the receiver 170B may be placed close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to implement a noise reduction function, in addition to collecting an audio signal. In some other embodiments, three, four, or more microphones 170C may be alternatively disposed in the electronic device 100, to collect an audio signal and reduce noise. The microphones may further identify a sound source, implement a directional recording function, and the like.

The headset interface 170D is configured to connect to a wired headset. The headset interface 170D may be the USB port 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, a capacitive pressure sensor. The capacitive pressure sensor may include at least two parallel plates made of conductive materials. When force is exerted on the pressure sensor 180A, capacitance between electrodes changes. The electronic device 100 determines pressure intensity based on a change of the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation strength is less than a first pressure threshold is performed on an icon of an SMS application, an instruction for viewing an SMS message is executed. When a touch operation whose touch operation strength is greater than or equal to the first pressure threshold is performed on an icon of the SMS application, an instruction for creating an SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to perform image stabilization during photographing. For example, when the shutter is pressed, the gyroscope sensor 180B detects an angle at which the electronic device 100 shakes, and calculates, based on the angle, a distance for which a lens module needs to compensate, so that the lens cancels the shake of the electronic device 100 through reverse motion, to implement image stabilization. The gyroscope sensor 180B may be further used in navigation and motion sensing game scenarios.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking of the flip cover is set based on a detected opening/closing state of the leather case or a detected opening/closing state of the flip cover.

The acceleration sensor 180E may detect acceleration values in various directions (usually on three axes) of the electronic device 100, and may detect a gravity value and a gravity direction when the electronic device 100 is still. The acceleration sensor 180E may be further configured to identify a posture of the electronic device, and is applied to an application such as switching between landscape mode and portrait mode or a pedometer.

The distance sensor 180F is configured to measure a distance. The electronic device 100 may measure the distance in an infrared or a laser manner. In some embodiments, in a photographing scenario, the electronic device 100 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is lower than another threshold, the electronic device 100 heats up the battery 142, to avoid abnormal shutdown of the electronic device 100 due to a low temperature. In some other embodiments, when the temperature is lower than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided by using the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may alternatively be disposed in the headset to form a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power button, a volume button, and the like. The key 190 may be a mechanical key, or may be a touch key. The electronic device 100 may receive key input, and generate key signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different use scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In an embodiment of this application, an Android system with a layered architecture is used as an example to describe a software structure of the electronic device 100.

Figure 2:
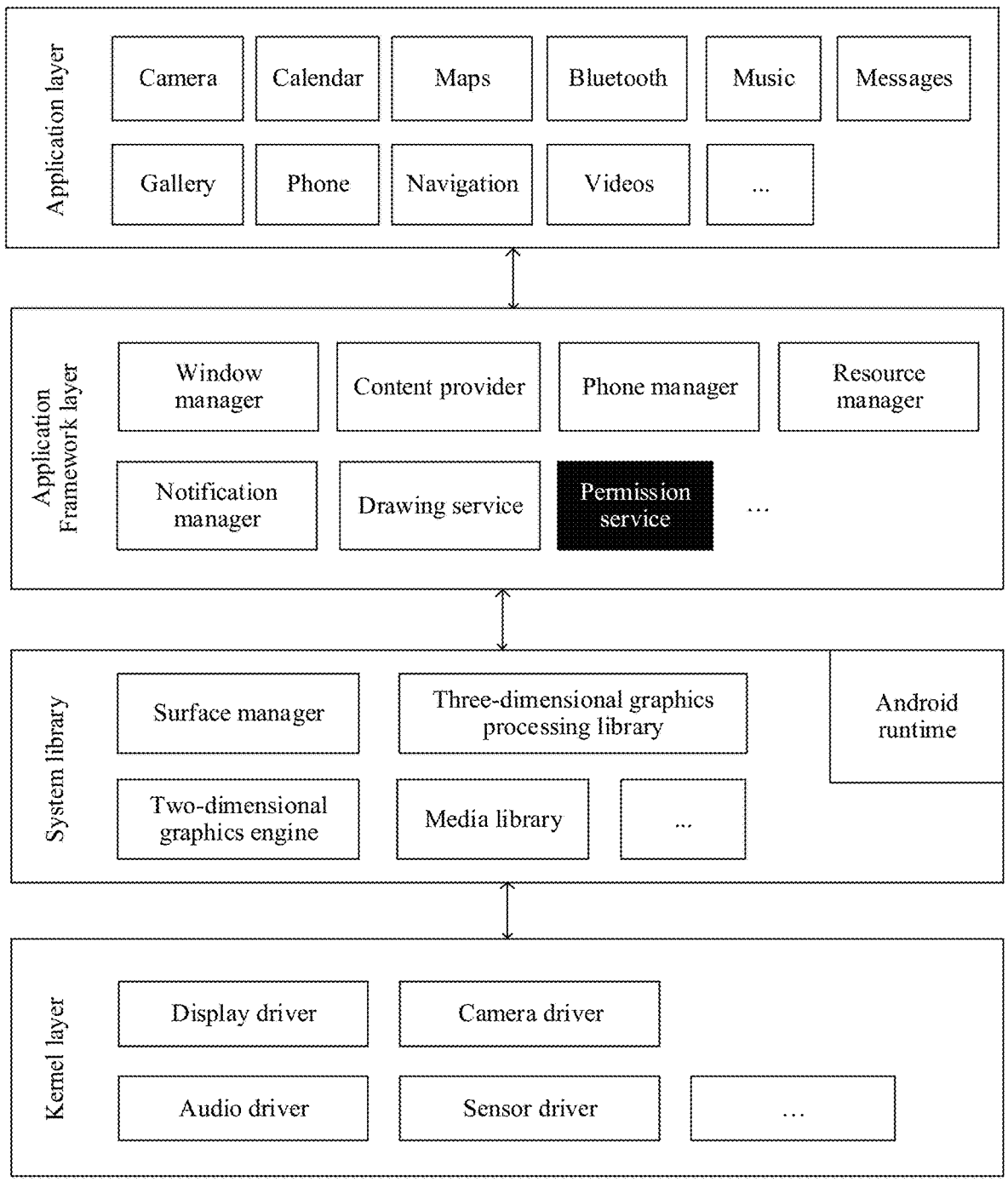
FIG. 2 is a schematic architectural diagram of an operating system in an electronic device according to an embodiment of this application.

FIG. 2 is a block diagram of a software structure of an electronic device 100 according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as "camera", "gallery", "calendar", "phone", "maps", "navigation", "Bluetooth", "music", "videos", and "messages".

The application framework layer provides an application programming interface (application programming interface, API) and a programming framework for an application at the application layer. The application framework layer includes some predefined functions.

As shown in FIG. 2, the application framework layer may include a permission (permission) service. The permission service may be used to manage an application permission of each application, for example, a permission to read calendar content (READ CALENDAR), a permission to use a camera (CAMERA), a permission to obtain location information (LOCATION), a permission to read a contact (READ CONTACTS), and a permission to read a call record (READ CALL LOG).

Figure 3A:
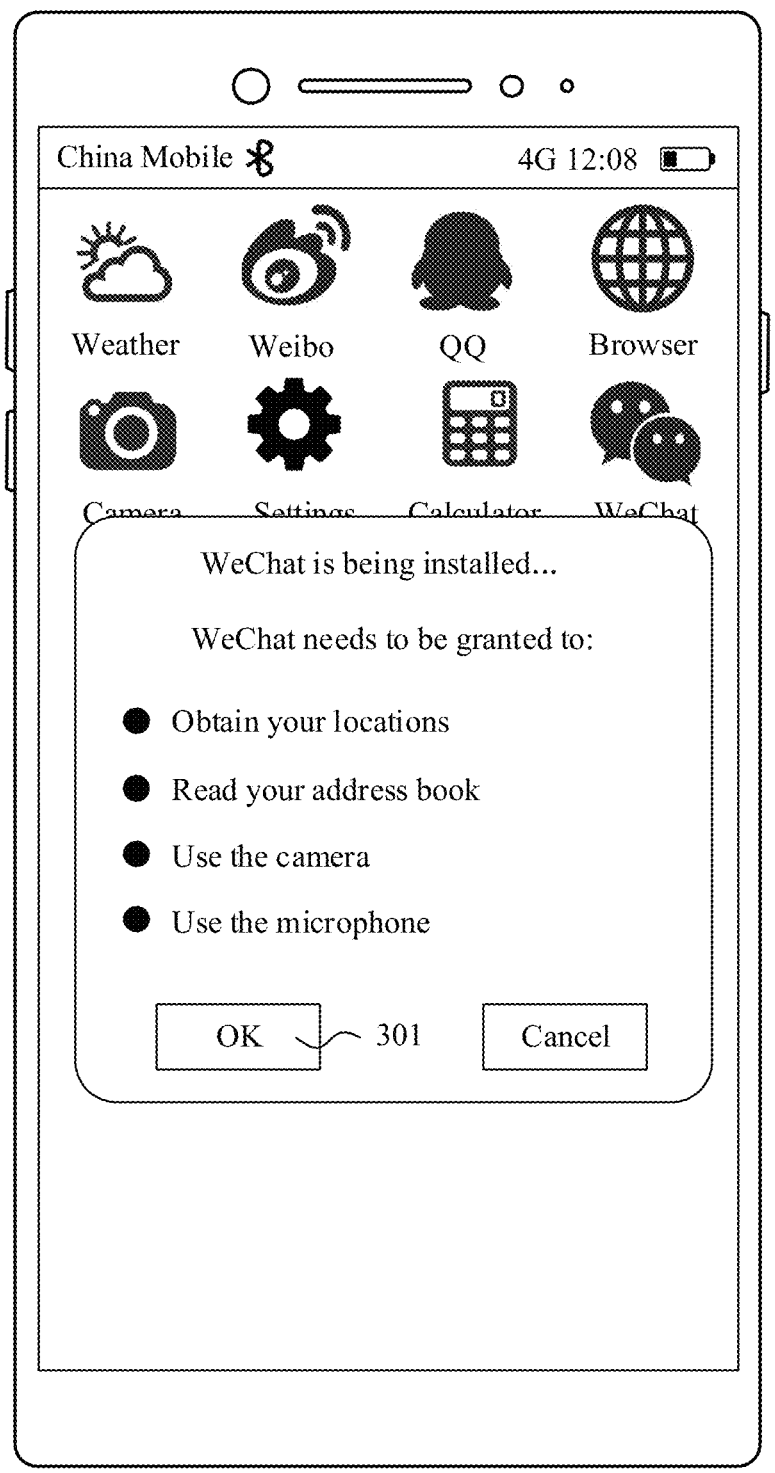
FIG. 3(a) and FIG. 3(b) are schematic diagrams 1 of an application scenario of a method for managing an application permission according to an embodiment of this application.

For example, the permission service may pre-register one or more application permissions for each application at the application layer. A WeChat application is used as an example. An installation package of the WeChat application usually records one or more application permissions required for running the WeChat application. When the WeChat application is installed at the application layer, the WeChat application may register the one or more application permissions with the permission service. In this case, as shown in FIG. 3(a), the permission service may display, to a user, the one or more application permissions to be registered by the WeChat application, and ask the user whether to grant the application permissions to the WeChat application. If it is detected that the user taps an OK button 301, the permission service may generate a permission access log of the WeChat application, record, in the permission access log, the one or more application permissions confirmed by the user, and complete an application permission registration procedure. Subsequently, in a running process of the WeChat application, when using each application permission, the WeChat application may invoke the permission service to query whether the application permission is recorded in the permission access log of the WeChat application. If the application permission is recorded in the permission access log, it indicates that the application permission used this time has been granted, and the permission service may grant the WeChat application to continue to use the application permission to implement a corresponding function.

Figure 3B:
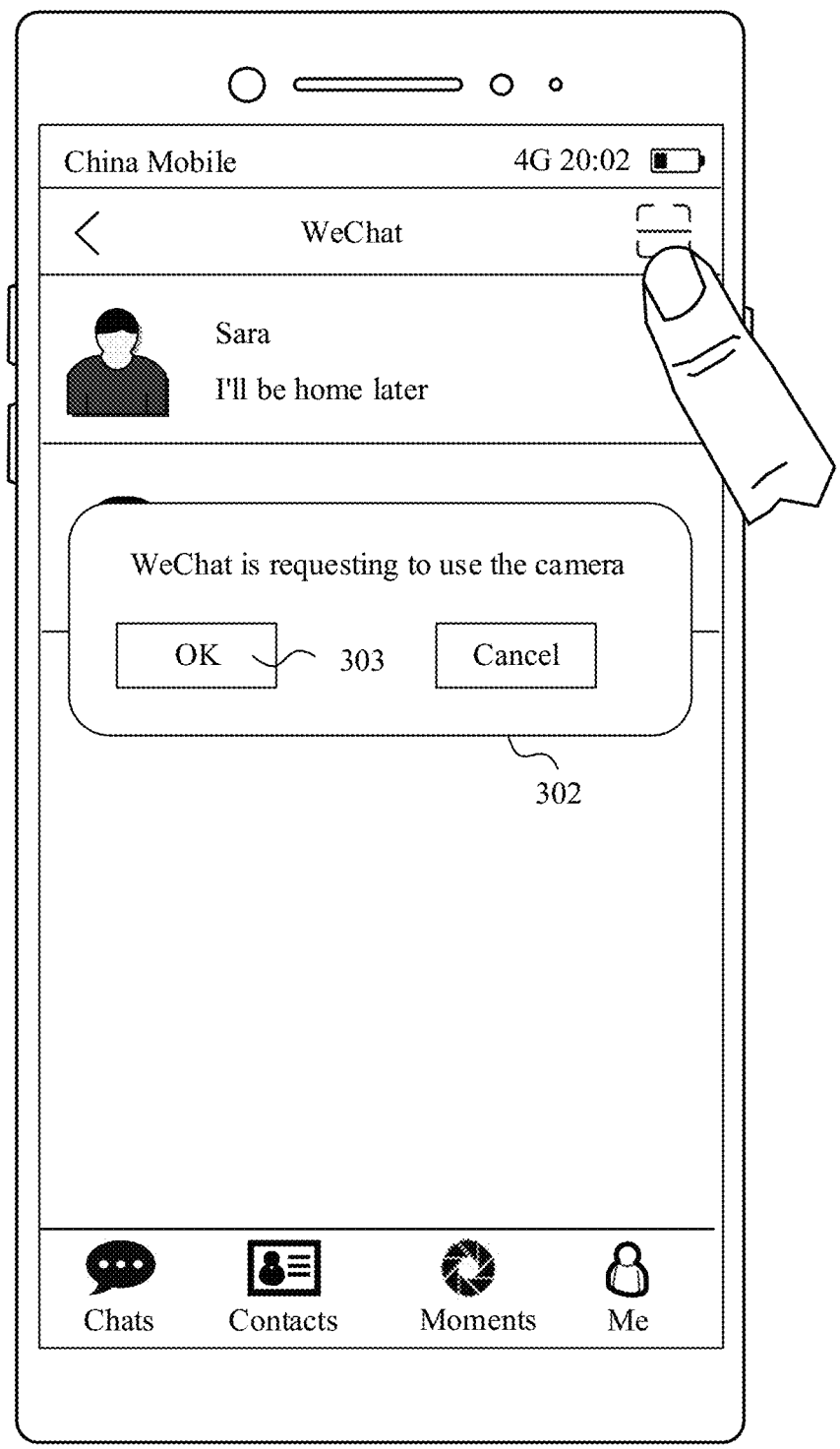

Alternatively, the WeChat application is still used as an example. When the WeChat application is installed, the one or more application permissions may temporarily not be registered with the permission service. When the WeChat application is run, for example, as shown in FIG. 3(b), when the user uses a code scanning function of the WeChat application for the first time, the WeChat application needs to apply to the permission service for the application permission to use the camera. In this case, still as shown in FIG. 3(b), the permission service may ask, by using a dialog window 302, the user whether to grant, to the WeChat application, the application permission to use the camera. If it is detected that the user taps an OK button 303, the permission service may add the permission to use the camera to the permission access log of the WeChat application. In this way, the permission service may gradually register, for the WeChat application in a running process of the WeChat application, one or more application permissions granted by the user. Subsequently, when the WeChat application applies to the permission service for using the camera again, the permission service may grant, based on the permission access log of the WeChat application, the WeChat application to use the camera.

In this embodiment of this application, after each application registers a corresponding application permission in the permission service, the permission service may further determine, with reference to a current specific use scenario, whether to grant the application to use an application permission, namely, determine, with reference to the current specific use scenario, whether to allow the application to use an application permission this time. For example, the WeChat application pre-registers, in the permission service, the application permission to use the camera. If it is detected that a current display interface includes keywords such as "video call" and "hang up" when the WeChat application requests the permission service to use the camera, it indicates that the current WeChat application is probably in a video call scenario. However, in the video call scenario, if the camera is not opened, the WeChat application cannot complete a video call function. Therefore, the permission service may grant the WeChat application (in other words, allow the WeChat application) to use the application permission to use the camera. Correspondingly, when the WeChat application requests the permission service to use the camera, if it is detected that a current display interface includes a control such as login or password, it indicates that the current WeChat application is probably in a login scenario. However, whether the camera is opened usually does not affect whether the WeChat application can be successfully logged in. Therefore, the permission service may reject the WeChat application to use the application permission to use the camera.

In other words, when an application applies to the permission service for using an application permission, the permission service may determine, with reference to a current specific use scenario, whether to grant the application permission to the application. If an application permission applied for and used by the application corresponds to a current use scenario, it indicates that using the application permission in the current use scenario is proper. In this case, the permission service may grant the application to continue to use the application permission, to avoid affecting normal use of various functions provided by the application by the user.

If an application permission applied for by the application does not correspond to a current use scenario, it indicates that it is improper to use the application permission in the current use scenario. If the application continues to be granted to use the application permission, unnecessary system resources are consumed when the application uses the application permission, which increases power consumption overheads. In addition, after the application is granted to use the application permission that does not correspond to the current use scenario, the application may further abuse the application permission to obtain user privacy, which increases a risk of user privacy leakage. Therefore, if the application permission applied for and used by the application this time does not correspond to the current use scenario, the permission service may reject to grant the application to use the application permission this time, to reduce system resource consumption and a security risk of user privacy leakage, and improve user experience.

Certainly, the application framework layer may further include a drawing service, a window manager, a content provider, a phone manager, a resource manager, a notification manager, and the like.

The window manager is configured to manage a window program. The window manager may obtain a size of a display, determine whether there is a status bar, perform screen locking, take a screenshot, and the like. The content provider is configured to store and obtain data, and enable the data to be accessed by an application. The data may include a video, an image, audio, a phone that are made and received, a browsing history and a bookmark, a phone book, and the like. The phone manager is configured to provide a communication function of the electronic device 100, for example, management of a call status (including answering, declining, or the like). The resource manager provides various resources for an application, such as a localized string, an icon, an image, a layout file, and a video file. The notification manager enables an application to display notification information in a status bar, and may be configured to convey a notification message. The notification manager may automatically disappear after a short pause without requiring user interaction. For example, the notification manager is configured to: notify download completion, give a message notification, and the like. The notification manager may alternatively be a notification that appears in a top status bar of the system in a form of a graph or a scroll bar text, for example, a notification of an application program running on a background or a notification that appears on the screen in a form of a dialog window. For example, text information is prompted in the status bar, an alert sound is produced, the electronic device vibrates, or an indicator light blinks.

The Android runtime includes a kernel library and a virtual machine. The Android runtime is responsible for scheduling and management of the Android system.

The kernel library includes two parts: a functional function that needs to be invoked in java language and a kernel library of Android.

The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D image layers for a plurality of applications.

The media library supports playback and recording of a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and the like. This is not limited in this embodiment of this application.

The following describes in detail a method for managing an application permission provided in the embodiments of this application with reference to the accompanying drawings by using an example in which an electronic device is a mobile phone.

Figure 4A:
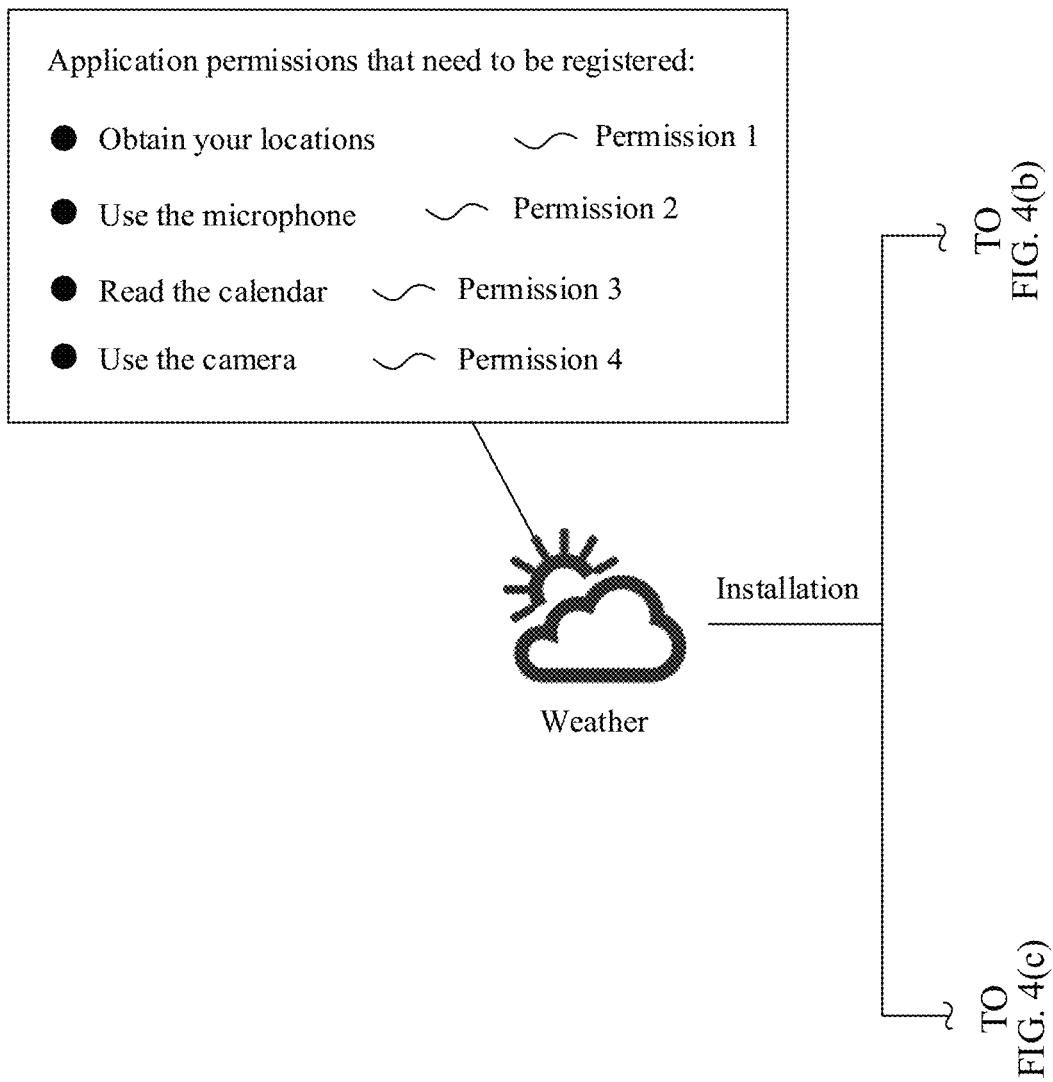
FIG. 4(a) to FIG. 4(c) are a schematic diagram 2 of an application scenario of a method for managing an application permission according to an embodiment of this application.

For example, a user installs a weather APP in the mobile phone. As shown in FIG. 4(a), a developer pre-records, in an installation package of the weather APP, a plurality of application permissions that the weather APP needs to register. For example, the application permissions that the weather APP needs to register include: a permission 1 to obtain location information, a permission 2 to use a microphone, a permission 3 to read a calendar, and a permission 4 to use a camera. When the weather APP is installed, the weather APP may request a permission service to register the permission 1 to the permission 4 for the weather APP. In this case, the permission service may identify, based on an application type of the weather APP, whether the application permissions that the weather APP requests to register include an application permission that does not correspond to the application type of the weather APP.

For example, as shown in Table 1, application permission sets corresponding to applications of various types may be pre-stored in the mobile phone. Using a social application in Table 1 as an example, application permissions corresponding to the social application are usually application permissions that need to be used when the social application provides various functions for the user, and when using the application permissions, the social application usually does not maliciously/extra obtain user privacy. In this case, when the weather APP requests to register the permission 1 to the permission 4, the mobile phone may query whether the permission 1 to the permission 4 all belong to an application permission set corresponding to a weather type. Certainly, the mobile phone may alternatively query a server for whether the permission 1 to the permission 4 include an improper application permission. This is not limited in this embodiment of this application.

TABLE 1

| Application type | Application permission set |
|---|---|
| Social type | {Read contacts, read photos, use the microphone, use the camera, and obtain the location information} |
| Weather type | {Read the calendar, use the microphone, and obtain the location information} |
| ... | ... |

Figure 4B:
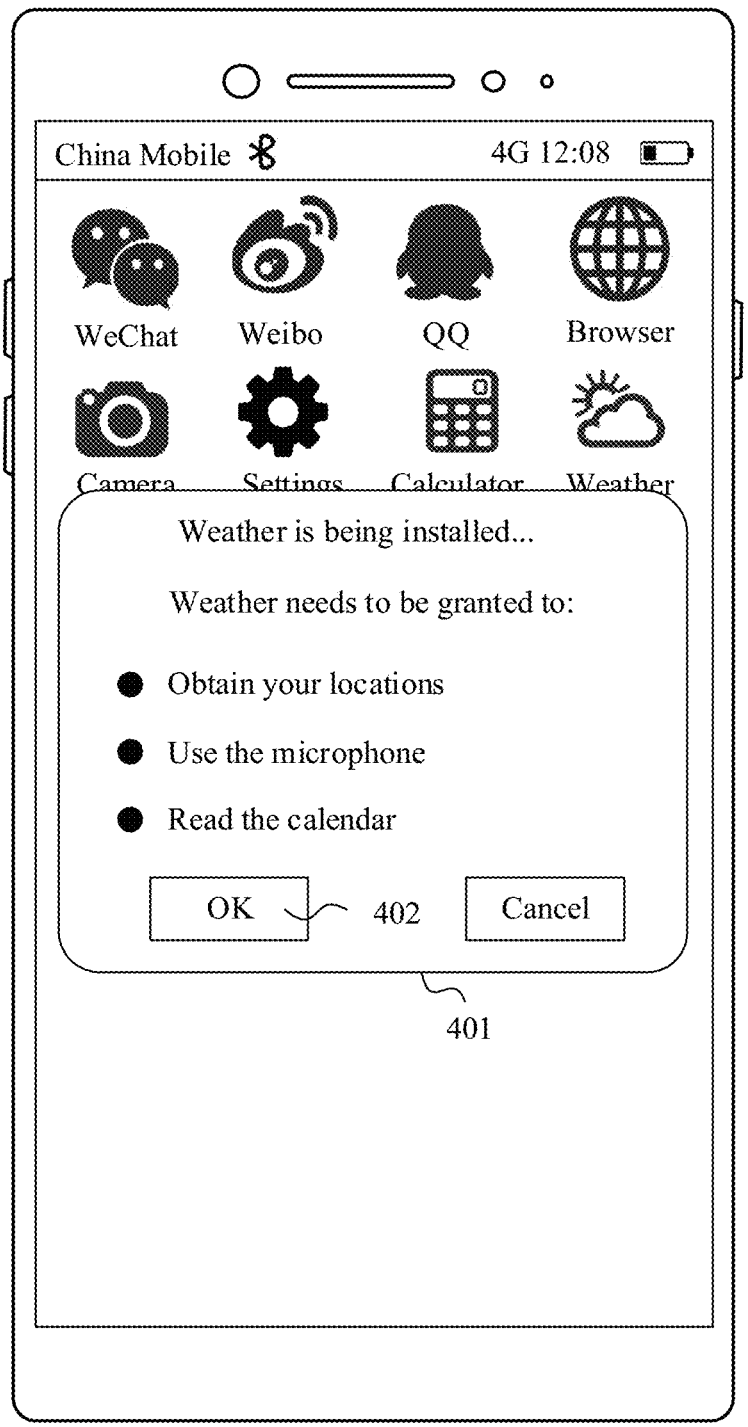

For example, if the permission 1 to the permission 3 all belong to the application permission set corresponding to the weather type, but the permission 4 does not belong to the application permission set corresponding to the weather type, it indicates that the permission 4 does not need to be used when the weather APP is run. In this case, the permission service may automatically reject to register the permission 4 for the weather APP. For example, as shown in FIG. 4(b), the mobile phone may prompt, in a dialog box 401, the user to grant the permission 1 to the permission 3 to the weather APP, and the mobile phone already rejects registration of the permission 4 by default. Therefore, the mobile phone does not need to prompt, in the dialog box 401, the user to grant the permission 4. Subsequently, if the mobile phone detects that the user taps an OK button 402 in the dialog box 401, the mobile phone may grant, in a permission access log of the weather APP, the weather APP to use the permission 1 to the permission 3. In this way, when an application registers application permissions in the mobile phone, the mobile phone can automatically shield some application permissions with a relatively high security risk for the user, to prevent the application from subsequently using the application permissions with a relatively high security risk to obtain user privacy, and avoid security problems such as privacy leakage.

Figure 4C:
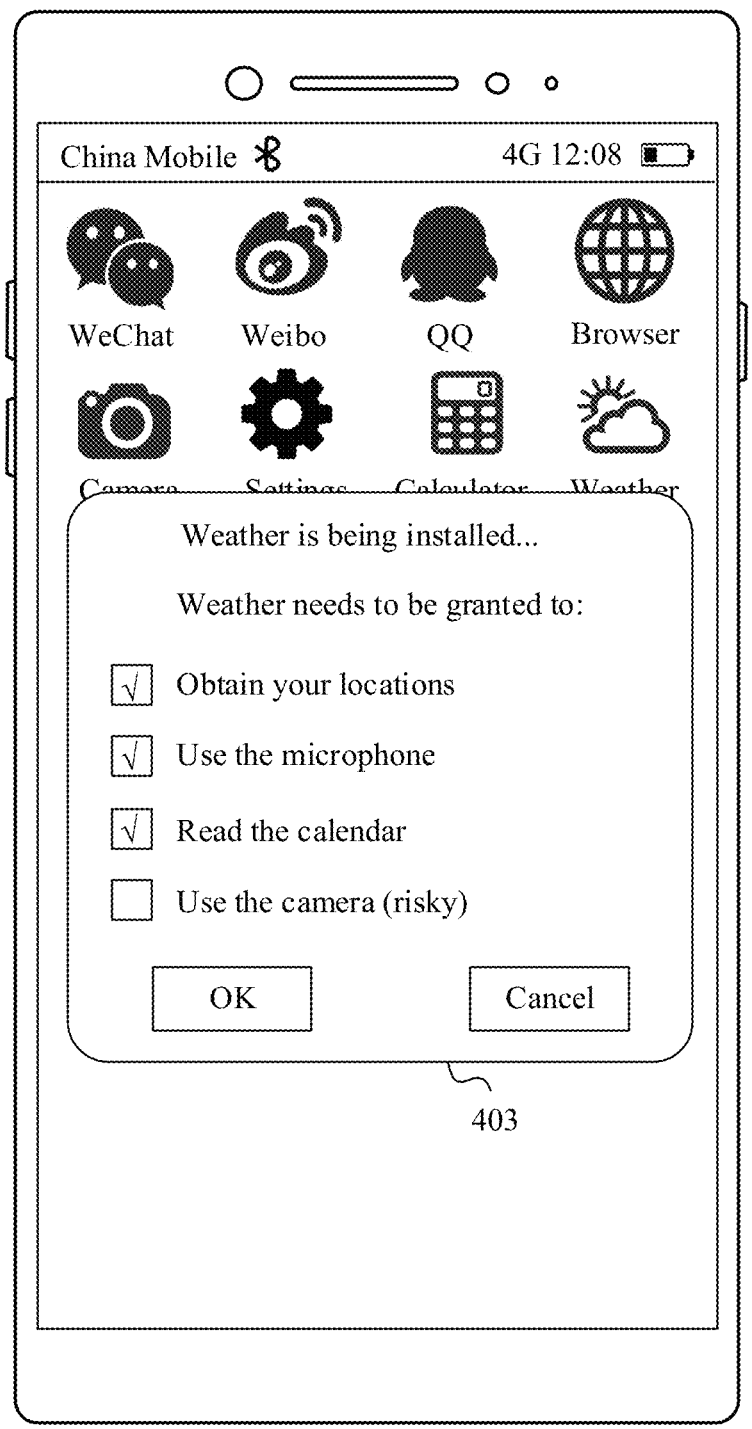

Alternatively, as shown in FIG. 4(c), when the mobile phone identifies that the permission 4 requested by the weather APP for registration is an improper application permission, the mobile phone may still display the permission 4 in a dialog box 403. However, the mobile phone may prompt, in the dialog box 403, the user that a security risk of granting the permission 4 is relatively high, and recommend the user not to grant the permission 4 to the weather APP. In this case, the user may manually select, based on a prompt in the dialog box 403, whether to grant the permission 4 to the weather APP. This is not limited in this embodiment of this application.

Alternatively, when a new application is installed or run in the mobile phone, the mobile phone may automatically register one or more corresponding application permissions for the application in the permission service based on the correspondence shown in Table 1. In this way, when using the new application, the user does not perceive a process of granting the application permissions to the application. In addition, because the application permissions granted to the application are usually relatively proper application permissions that are determined by the mobile phone and that match the application type, a risk that the application maliciously uses an improper application permission subsequently to obtain user privacy can be reduced.

In some embodiments, after the application registers the one or more application permissions in the permission service of the mobile phone, when using each application permission, the application needs to invoke the permission service to determine that a currently used application permission is a registered application permission.

Figure 5:
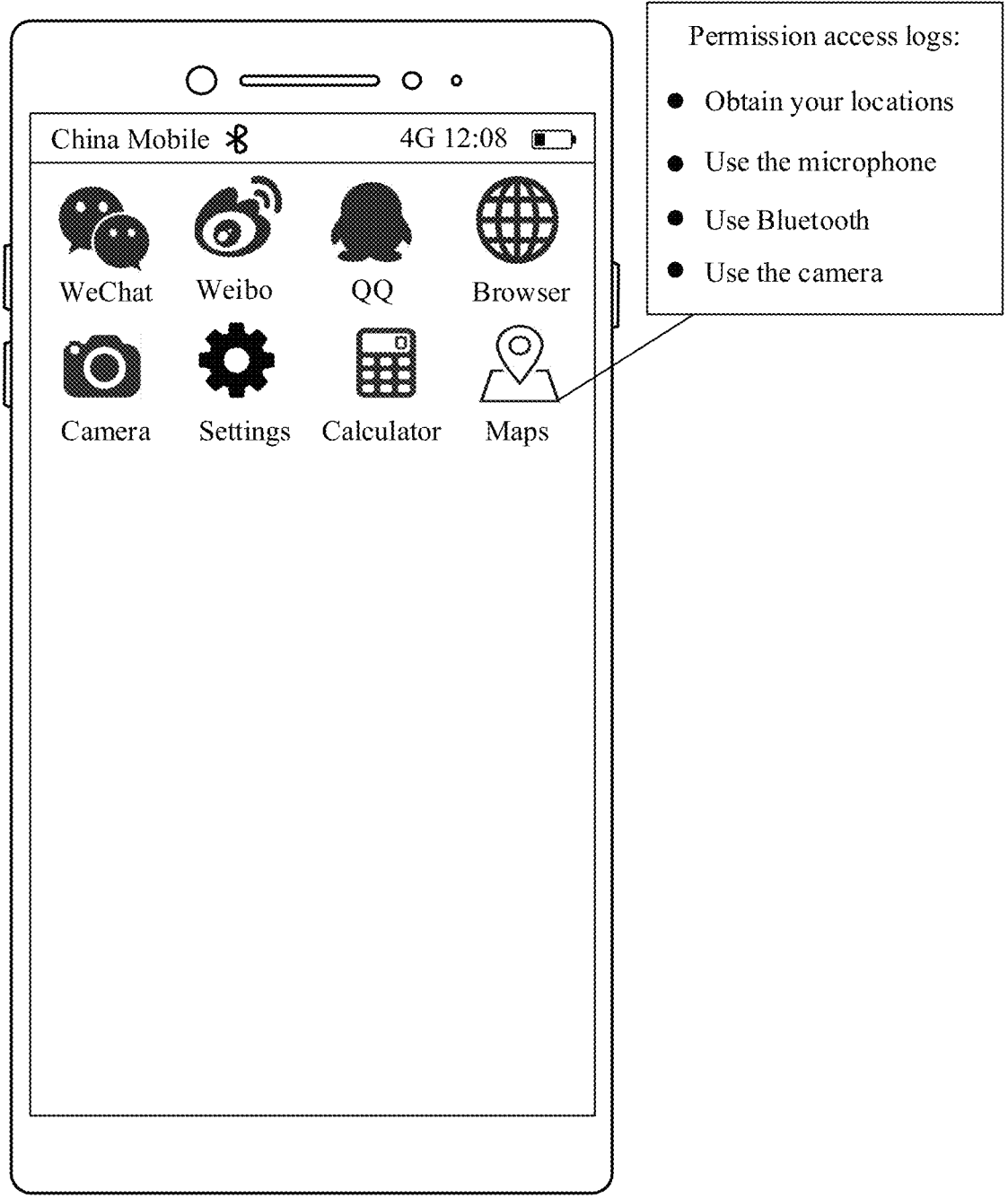
FIG. 5 is a schematic diagram 3 of an application scenario of a method for managing an application permission according to an embodiment of this application.

For example, as shown in FIG. 5, the map application registers, in the permission service, four application permissions such as the permission to obtain the location information, the permission to use the microphone, the permission to use the camera, and the permission to use Bluetooth. In this case, when the map application is to use any application permission, the map application needs to apply to the permission service for granting the map application to use the application permission this time. For example, if the map application needs to use the camera to obtain image information captured by the camera when the map application is running, the map application may request the permission service to grant the application permission to use the camera this time. Further, the permission service may query, in the permission access log of the map application, whether the map application has registered the permission to use the camera. If the map application has registered the application permission to use the camera, the permission service may further determine, based on a current use scenario, whether to grant the map application to use the camera this time.

For example, a scenario identification model may be preset in the mobile phone, and the scenario identification model may be used to identify a use scenario of a current application. For example, when the map application requests the permission service to grant the application permission to use the camera this time, the permission service may invoke a screenshot service to obtain a screenshot of a currently displayed interface. Further, the permission service may input the obtained screenshot into the scenario identification model, and the scenario identification model identifies a current use scenario based on screenshot information such as a text or a control in the screenshot.

Alternatively, the mobile phone may further extract a keyword on a current display interface by using an OCR (optical character recognition, optical character recognition) technology. Further, the permission service may input the extracted keyword into the scenario identification model, and the scenario identification model identifies a current use scenario based on the keyword.

Alternatively, the mobile phone may further obtain a layout feature of the current display interface by using a service such as a view (view), for example, a layout tree (layout tree). Further, the permission service may input the extracted layout feature into the scenario identification model, and the scenario identification model identifies a current use scenario based on the layout feature. Certainly, the mobile phone may further request the server to identify a specific use scenario of a current application. A manner of identifying a specific use scenario is not limited in this embodiment of this application.

Figure 6A:
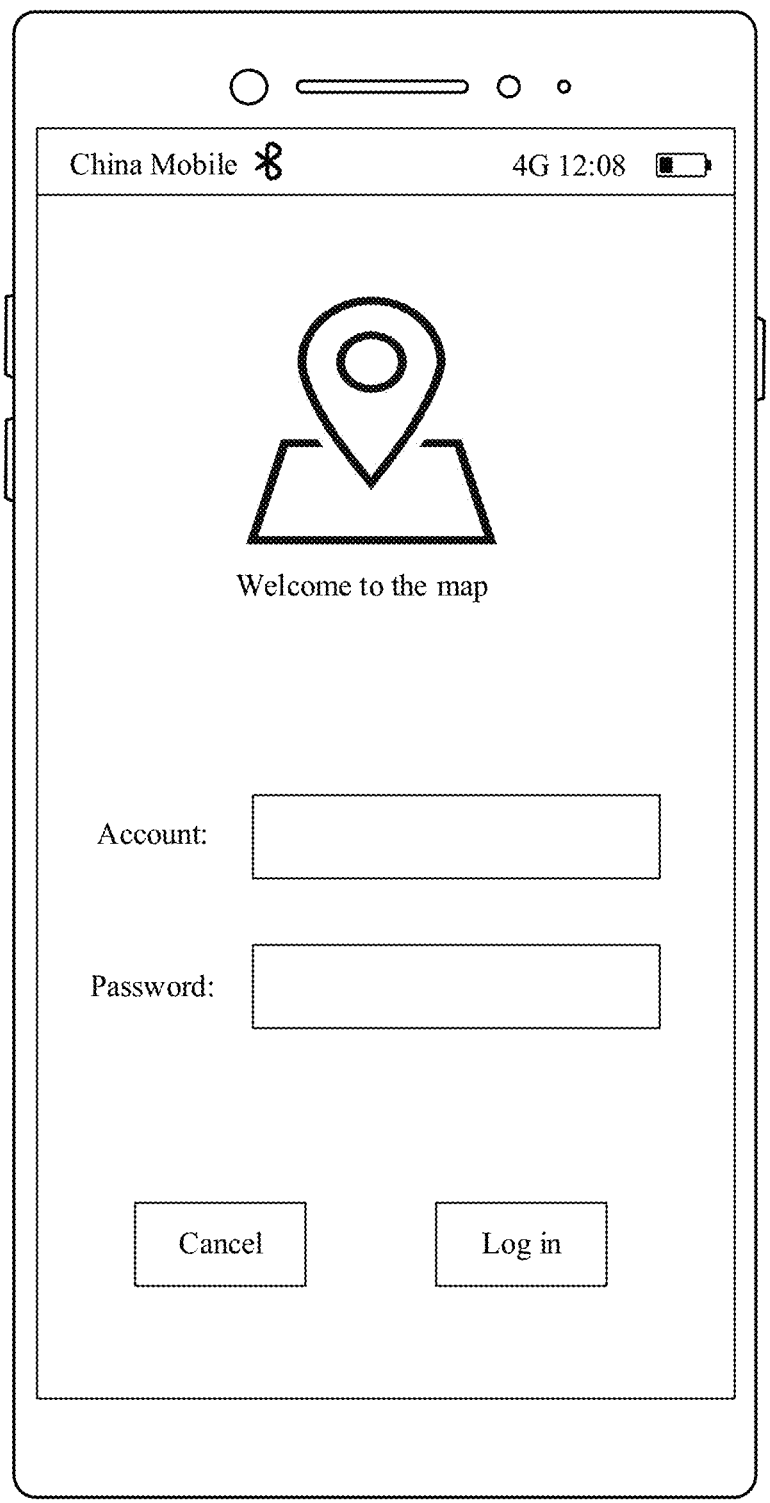
FIG. 6(a) to FIG. 6 (c) are schematic diagrams 4 of an application scenario of a method for managing an application permission according to an embodiment of this application.
Figure 6B:
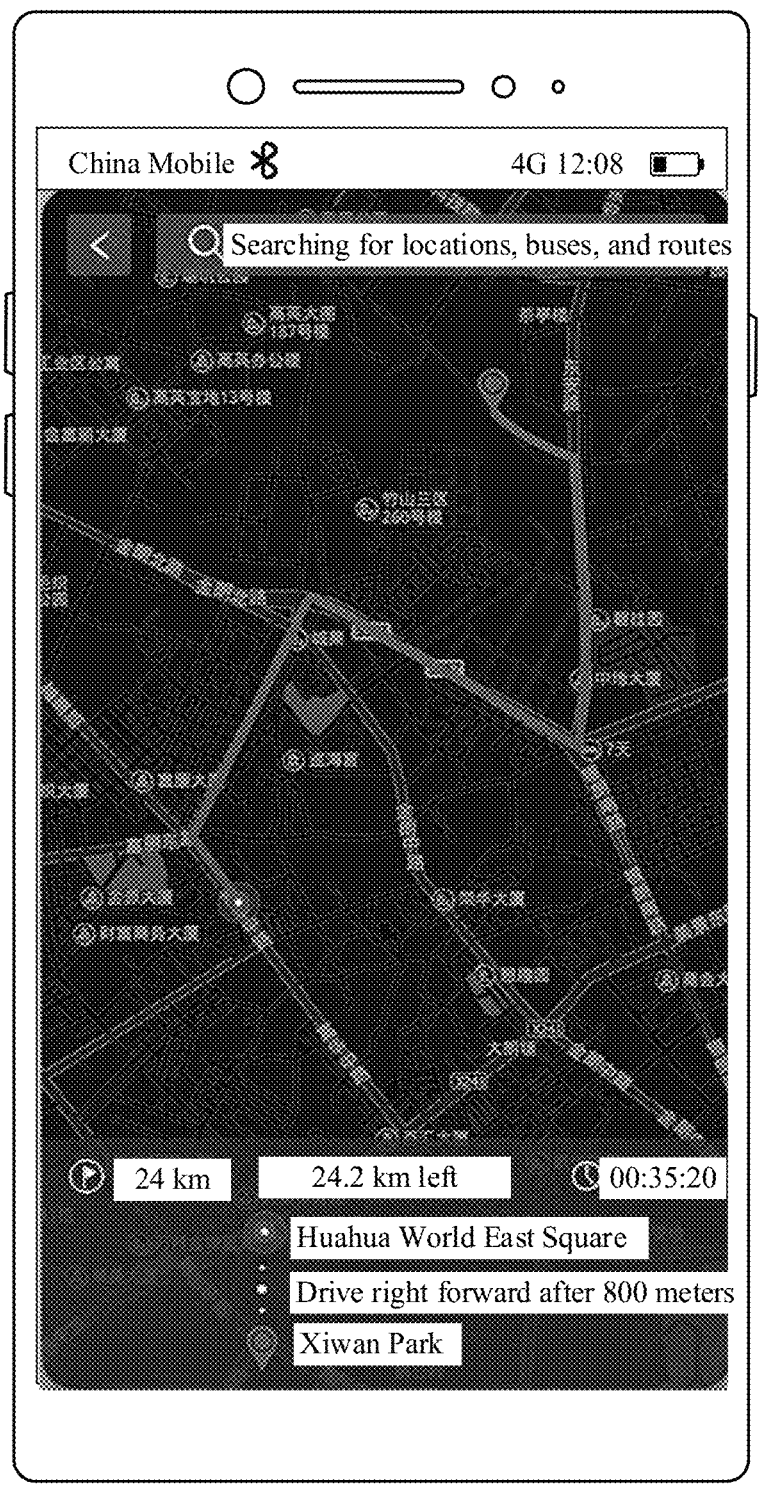
Figure 6C:
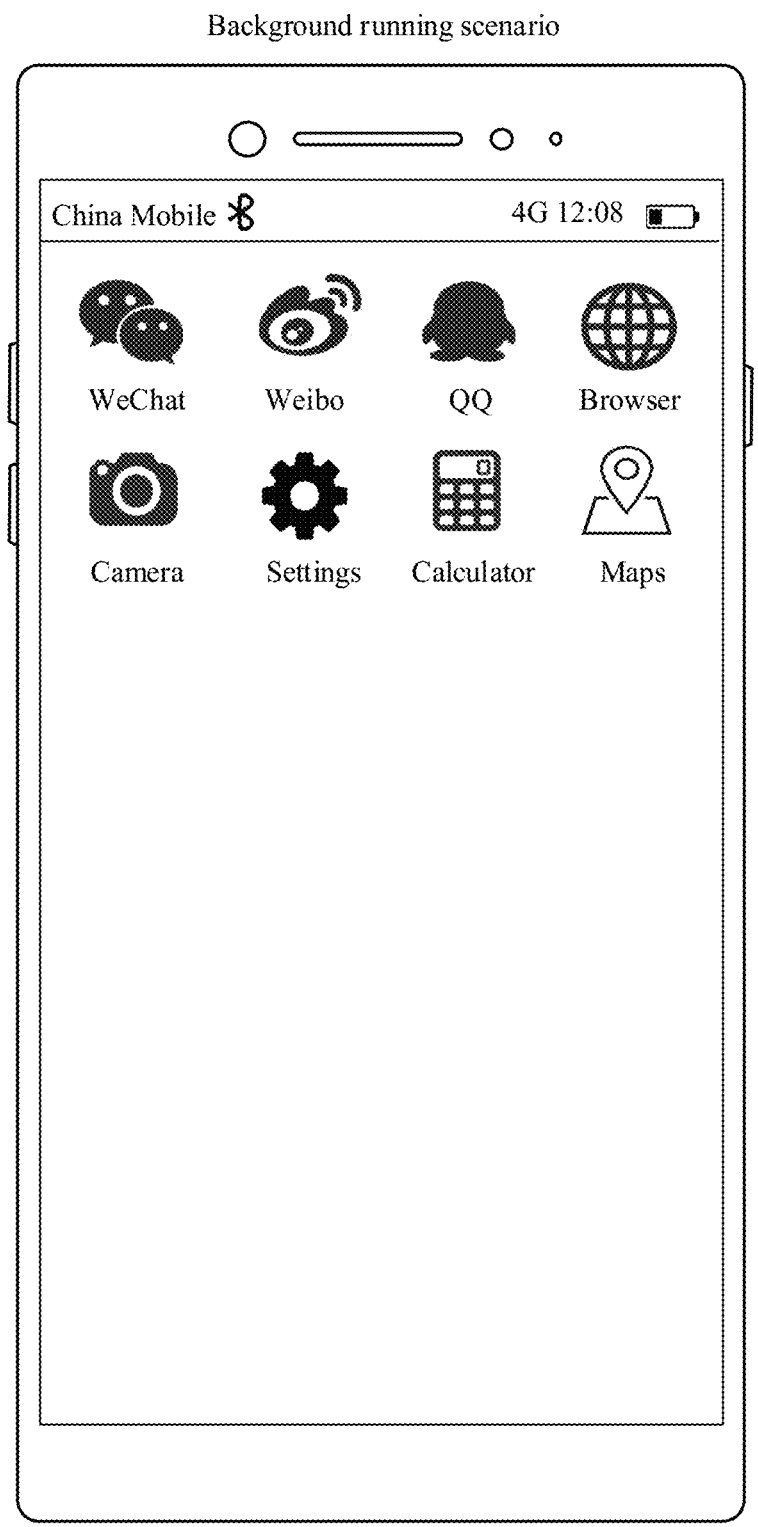

The map application is still used as an example. As shown in FIG. 6(a), if an icon or a keyword such as an account or a login password appears in a current display interface, the mobile phone may determine that the map application is currently in a login scenario. As shown in FIG. 6(b), if an icon or a keyword such as a map, a navigation, or a route appears in the current display interface, the mobile phone may determine that the map application is currently in a positioning scenario. As shown in FIG. 6(c), if no display element of the map application appears in the current display interface, the mobile phone may determine that the map application is currently in a background running scenario.

Figure 7A:
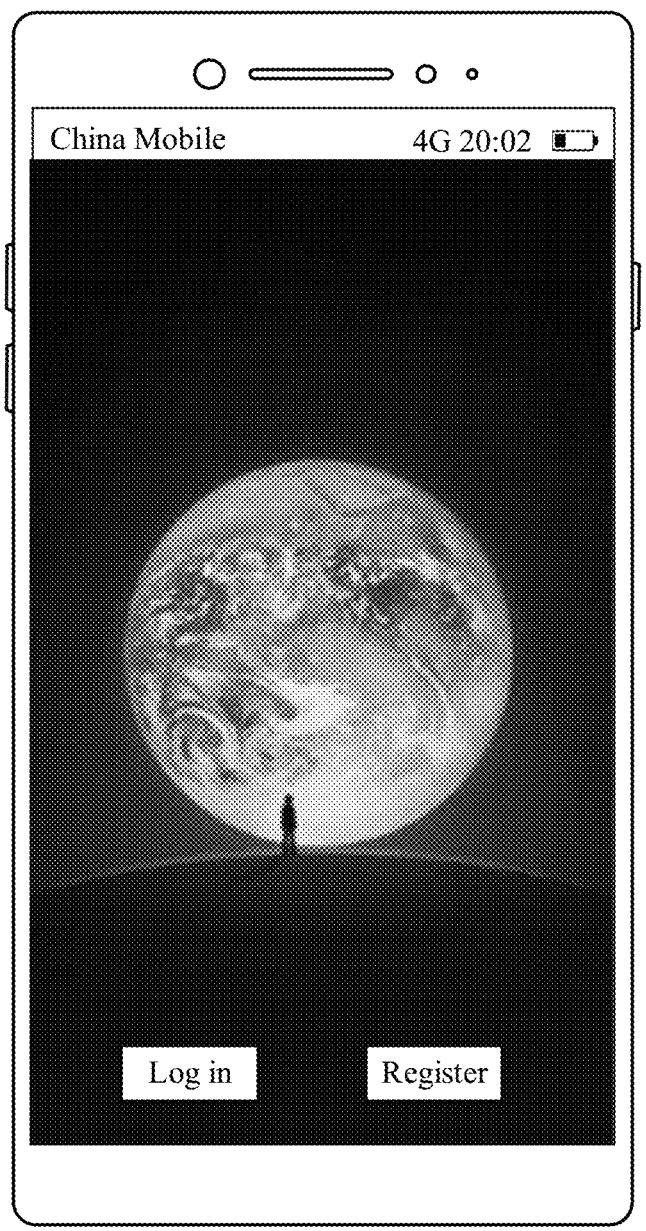
FIG. 7(a) to FIG. 7(c) are schematic diagrams 5 of an application scenario of a method for managing an application permission according to an embodiment of this application.
Figure 7B:
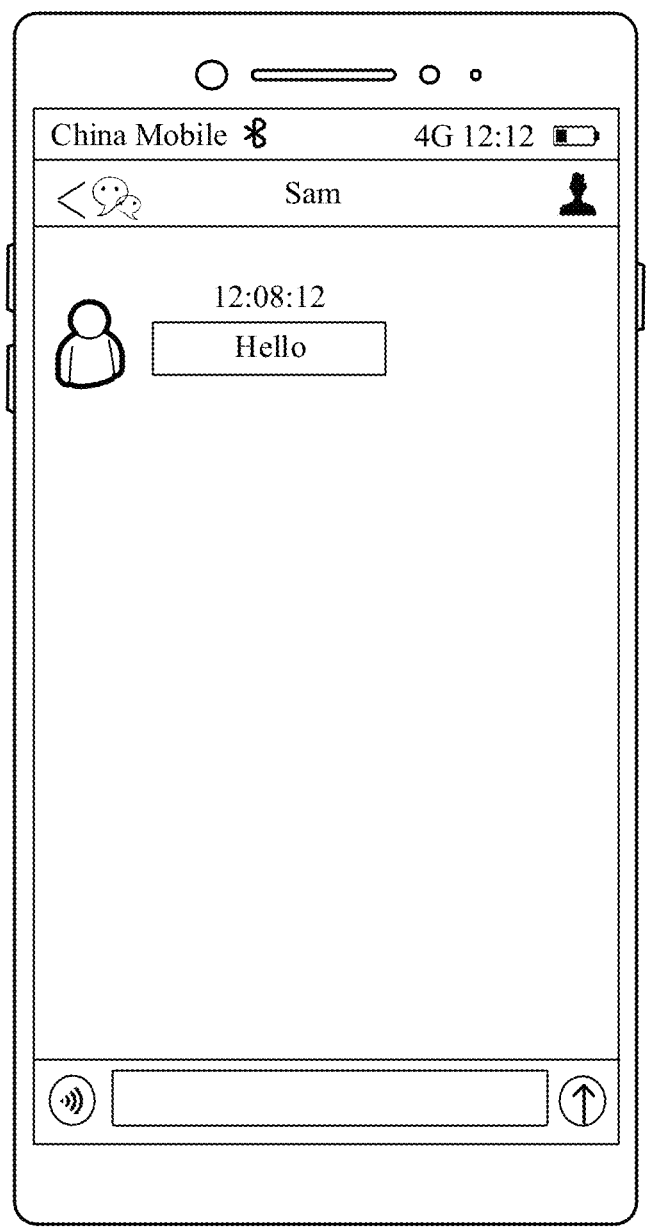
Figure 7C:

Alternatively, a WeChat application is used as an example. As shown in FIG. 7(a), if the mobile phone detects that an icon or a keyword such as an account or a login password appears in a current display interface, the mobile phone may mark the display interface as a login scenario. As shown in FIG. 7(b), if the mobile phone detects that an icon or a control such as a chat bubble appears in the current display interface, the mobile phone may mark the display interface as a message scenario. As shown in FIG. 7(c), if the mobile phone detects that a control such as a playing progress bar or a playing button appears in the current display interface, or the mobile phone detects that consumed data traffic is greater than a threshold, the mobile phone may mark the display interface as a playing scenario.

Figure 8:
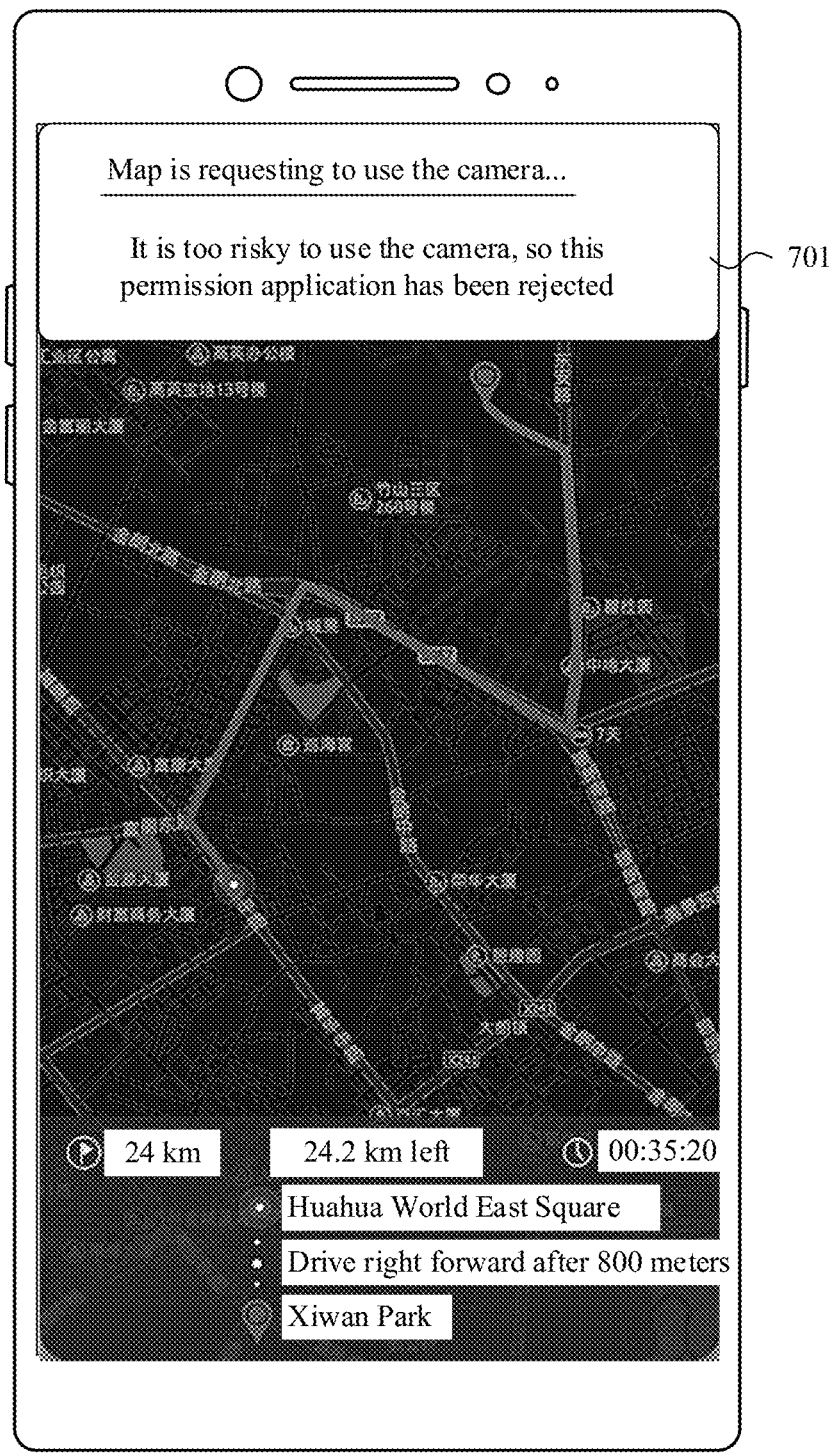
FIG. 8 is a schematic diagram 6 of an application scenario of a method for managing an application permission according to an embodiment of this application.

The map application is still used as an example. After the mobile phone determines the current use scenario of the map application, the mobile phone may determine, with reference to the use scenario, whether to grant, to the map application, the application permission to use the camera this time. As shown in FIG. 8, if it is identified that the map application is in the positioning scenario, the mobile phone may determine whether an application permission matching the positioning scenario includes the application permission to use the camera. If the application permission matching the positioning scenario includes the application permission to use the camera, it indicates that a security risk of performing an operation by using the camera by the map application is relatively low, and the permission service may grant, to the map application, the application permission to use the camera. Correspondingly, if the application permission matching the positioning scenario does not include the application permission to use the camera, it indicates that a security risk of performing an operation by using the camera by the map application is relatively high. In this case, the permission service may reject to grant, to the map application, the application permission to use the camera.

For example, as shown in Table 2, a correspondence between each application permission and a use scenario whitelist may be preset in the mobile phone.

TABLE 2

| Application permission | Use a scenario whitelist |
| --- | --- |
| Read a calendar | Conference reservation scenario |
|  | Train ticket/Ticket/Accommodation reservation scenario |
|  | Birthday/Anniversary reservation scenario |
| Use the camera | Photographing/Video recording scenario |
|  | Riding scenario |
|  | Shopping/Scanning code scenario |
|  | Social communication scenario |
|  | Certificate handling scenario |
| Read the address book | Adding friend scenario |
|  | Mobile phone backup scenario |
|  | Address book management scenario |
| Obtain the location information | Navigation scenarios such as walking, riding, and driving |
|  | Motion scenario |
|  | Photographing scenario |
|  | Positioning scenarios of life services |
| . . . | . . . |

Each application permission corresponds to one or more use scenarios in which the application permission is allowed to be used. For example, use scenarios in which the application permission to use the camera is allowed to be used includes: the photographing/video recording scenario, the riding scenario, the shopping/scanning code scenario, the social communication scenario, and the certificate handling scenario. For example, the WeChat application is run on the mobile phone. When the WeChat application is run, if it is detected that the WeChat application applies to the permission service for using the camera in a scenario in the use scenario whitelist, such as photographing/video recording, the permission service may grant a permission request for using the camera by the WeChat application this time. If it is detected that the WeChat application applies to the permission service for using the camera in a scenario that is not included in the use scenario whitelist such as chatting, the permission service may reject a permission request for using the camera by the WeChat application this time.

For example, if the mobile phone identifies that the use scenario in which the map application requests to use the camera is the positioning scenario, the mobile phone may determine, by using Table 2, that the positioning scenario is not in the use scenario whitelist corresponding to the application permission to use the camera. This indicates that an operation of using the camera in the positioning scenario has a relatively high security risk for the user. Therefore, the mobile phone may reject to grant, to the map application, the application permission to use the camera this time. In this case, as shown in FIG. 8, the mobile phone may display a notification 701, and notify, in the notification 701, the user that the mobile phone has rejected the permission application to use the camera by the map application this time.

For example, when the permission service in the mobile phone rejects to grant, to the map application, the application permission to use the camera, a permission rejection response of PERMISSION DENIED may be returned to the map application. After receiving the permission rejection response, the map application cannot continue to invoke a camera service to open the camera to capture image information, to avoid a problem that the application abuses the application permission to consume system resources or obtain user privacy.

It should be noted that division of the foregoing use scenarios in this embodiment of this application is merely an example for description. This is not limited in this embodiment of this application.

In addition, in some embodiments of this application, the "use scenario" may be used as a concept to describe the technical solutions provided in this application. When detecting a detection item that is used to indicate a use scenario, such as a text, an icon, a control, or an operation, the mobile phone may determine, based on these detection items, whether to grant or reject an application to use an application permission. In this case, the mobile phone actually does not need to perform the step of determining a use scenario. For example, a correspondence between different application permissions and a corresponding icon (or control) whitelist may be set in the mobile phone. If the mobile phone detects that an icon of a map or a route appears on a current display interface, it means that the mobile phone is probably in the positioning scenario at this time. In this case, if the permission service receives a request for using the camera by the map application, the permission service may directly reject, based on the foregoing correspondence, the permission application to use the camera by the map application this time.

Figure 9A:
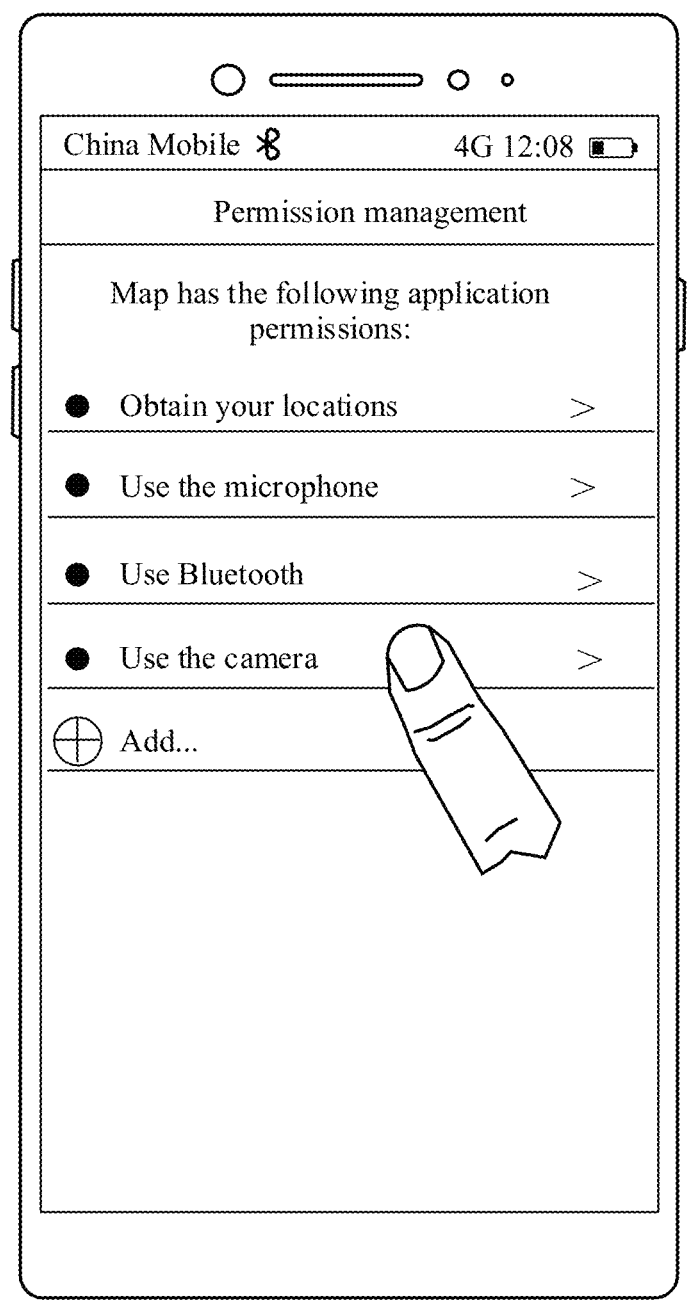
FIG. 9(a) and FIG. 9(b) are schematic diagrams 7 of an application scenario of a method for managing an application permission according to an embodiment of this application.
Figure 9B:
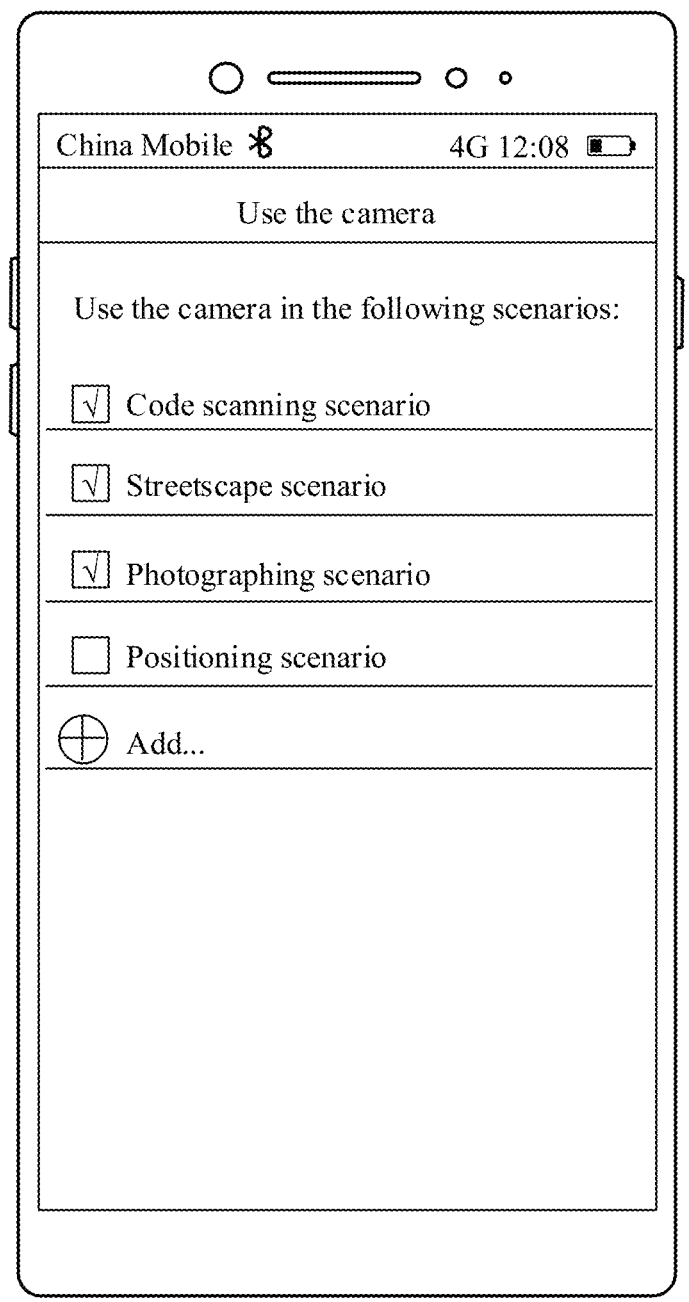

Further, if the mobile phone detects that the user taps the display notification 701, as shown in FIG. 9(a), the mobile phone may jump to a permission management interface 801 of the map application. In the permission management interface 801, the user may manually enable or disable a corresponding application permission for the map application. In addition, for an enabled application permission, the mobile phone may further set a function of modifying a specific use scenario of the application permission. For example, if the mobile phone detects that the user taps a settings button 802 for using the application permission of the camera in the permission management interface 801, as shown in FIG. 9(*b*), the mobile phone may display a specific use scenario in which the map application uses the application permission of the camera. The user may manually add a use scenario in which the map application is allowed to use the camera, or may disable a currently granted use scenario in which the map application is allowed to use the camera. This is not limited in this embodiment of this application.

Figure 10:
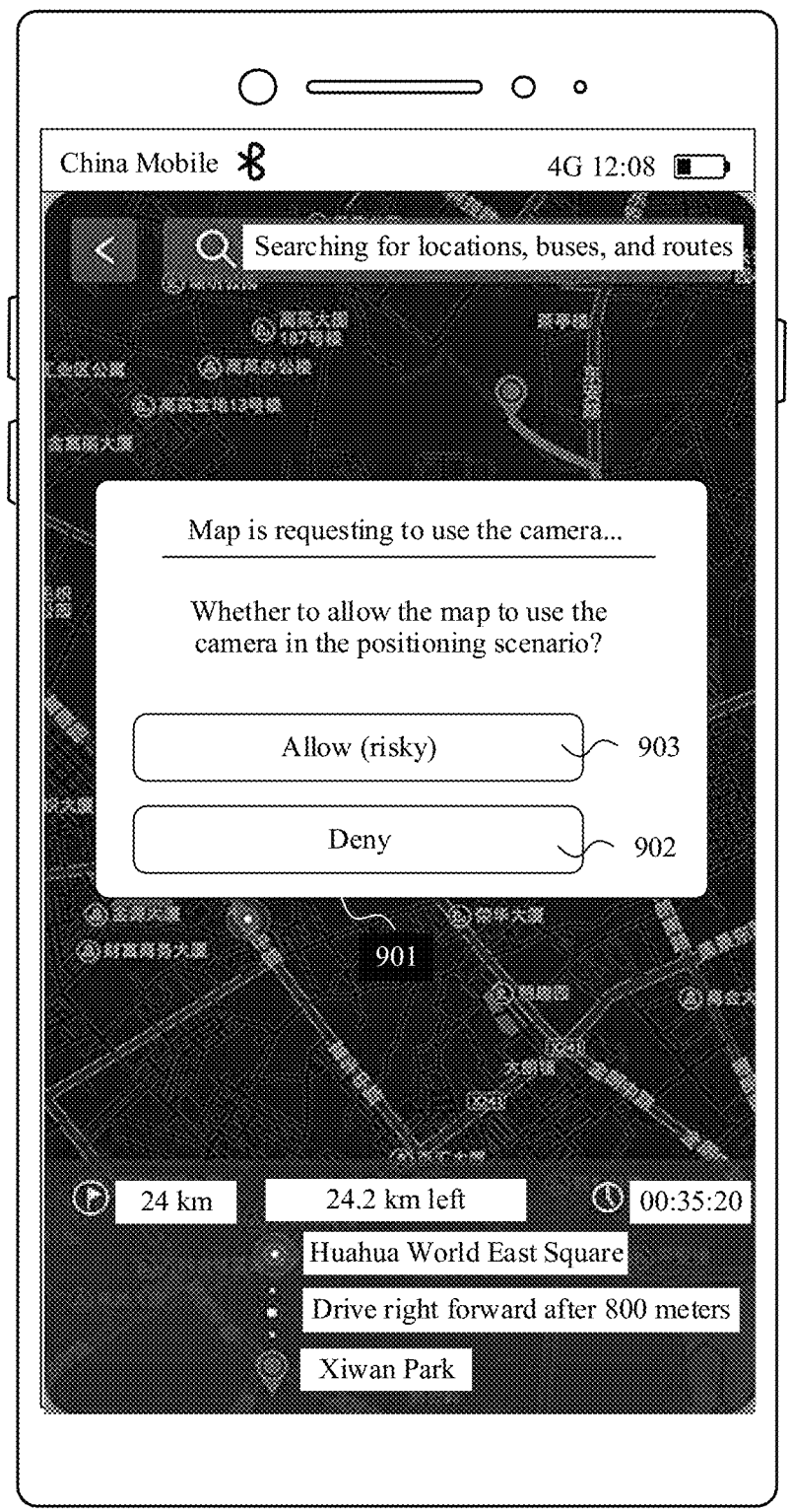
FIG. 10 is a schematic diagram 8 of an application scenario of a method for managing an application permission according to an embodiment of this application.

In some other embodiments, if the mobile phone determines that a current positioning scenario is not in the use scenario whitelist corresponding to the application permission to use the camera, as shown in FIG. 10, the mobile phone may display a dialog box 901, and prompt, in the dialog box 901, the user that the map application currently expects to use the camera function. In addition, the mobile phone may ask, in the prompt box 901, the user whether the map application is allowed to use the camera this time. If it is detected that the user taps a "reject" button 902, the permission service in the mobile phone rejects to grant, to the map application, the application permission to use the camera. If it is detected that the user taps an "allow" button 903, it indicates that the user has learned of a security risk of using the camera in the current use scenario, and the user is still willing to grant the map application to use the camera in the current use scenario. In this case, the mobile phone may grant, to the map application, the application permission to use the camera. For example, the permission service may return a permission grant response of PERMISSION_GRANTED to the map application. After receiving the permission grant response, the map application can continue to invoke the camera service to open the camera to capture image information.

It should be noted that in addition to setting a correspondence between each application permission and the use scenario whitelist in the mobile phone, a correspondence between each application permission and a use scenario blacklist may be further set in the mobile phone. In this case, if the mobile phone detects that the map application applies to the permission service for the application permission to use the camera, the mobile phone may determine whether a current use scenario is in a use scenario blacklist corresponding to the application permission to use the camera. If the current use scenario is in the use scenario blacklist corresponding to the application permission to use the camera, it indicates that the operation of using the camera by the map application in the current use scenario is an operation with a relatively high security risk for the user. Therefore, the mobile phone may reject to grant, to the map application, the application permission to use the camera.

Figure 11:
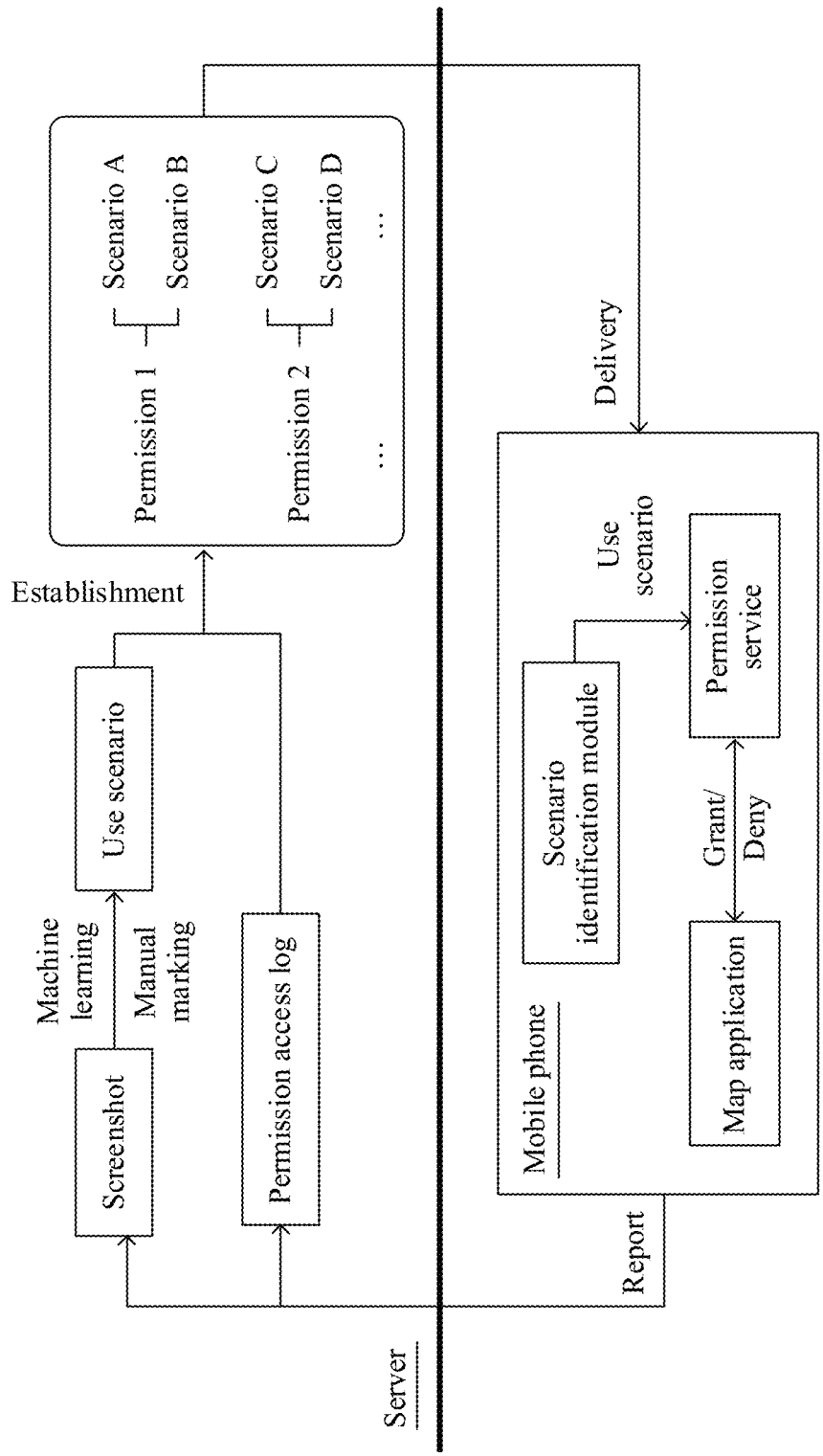
FIG. 11 is a schematic diagram 9 of an application scenario of a method for managing an application permission according to an embodiment of this application.

Alternatively, if the mobile phone detects that the map application applies to the permission service for the application permission to use the camera, the mobile phone may further request a server to determine whether the map application is suitable for using the camera to capture image information in a current use scenario. This is not limited in this embodiment of this application. For example, as shown in FIG. 11, the mobile phone may report the permission access log of the map application to the server. In addition, when running the map application, the mobile phone may further periodically take a screenshot of the display interface, and report an obtained screenshot to the server. Based on the screenshot sent by the mobile phone, the server may identify, by using a related algorithm of machine learning, use scenarios to which different screenshots belong. Alternatively, a use scenario of each screenshot may be marked by a staff member by using a manual marking method.

Further, with reference to the permission access log of the map application, the server may establish a correspondence (for example, Table 2) between different application permissions in the permission access log and the use scenario whitelist, and deliver the correspondence to the mobile phone. In this way, when the map application in the mobile phone requests the permission service to use an application permission, the permission service may determine, based on a specific use scenario identified by the scenario identification module and the correspondence delivered by the server, whether the application permission requested by the map application in the current use scenario is proper, and further grant or reject the map application to use the application permission.

In the foregoing embodiment, an example in which the map application requests to use the application permission to use the camera in the positioning scenario is used for description. It may be understood that when the map application requests to use any application permission in another use scenario, the permission service in the mobile phone may allow/reject, according to the foregoing method, the map application to use the application permission this time.

Correspondingly, when another application applies to use an application permission in different use scenarios, the mobile phone may also allow/reject, according to the foregoing method, a request for using the application permission by the application.

Figure 12:
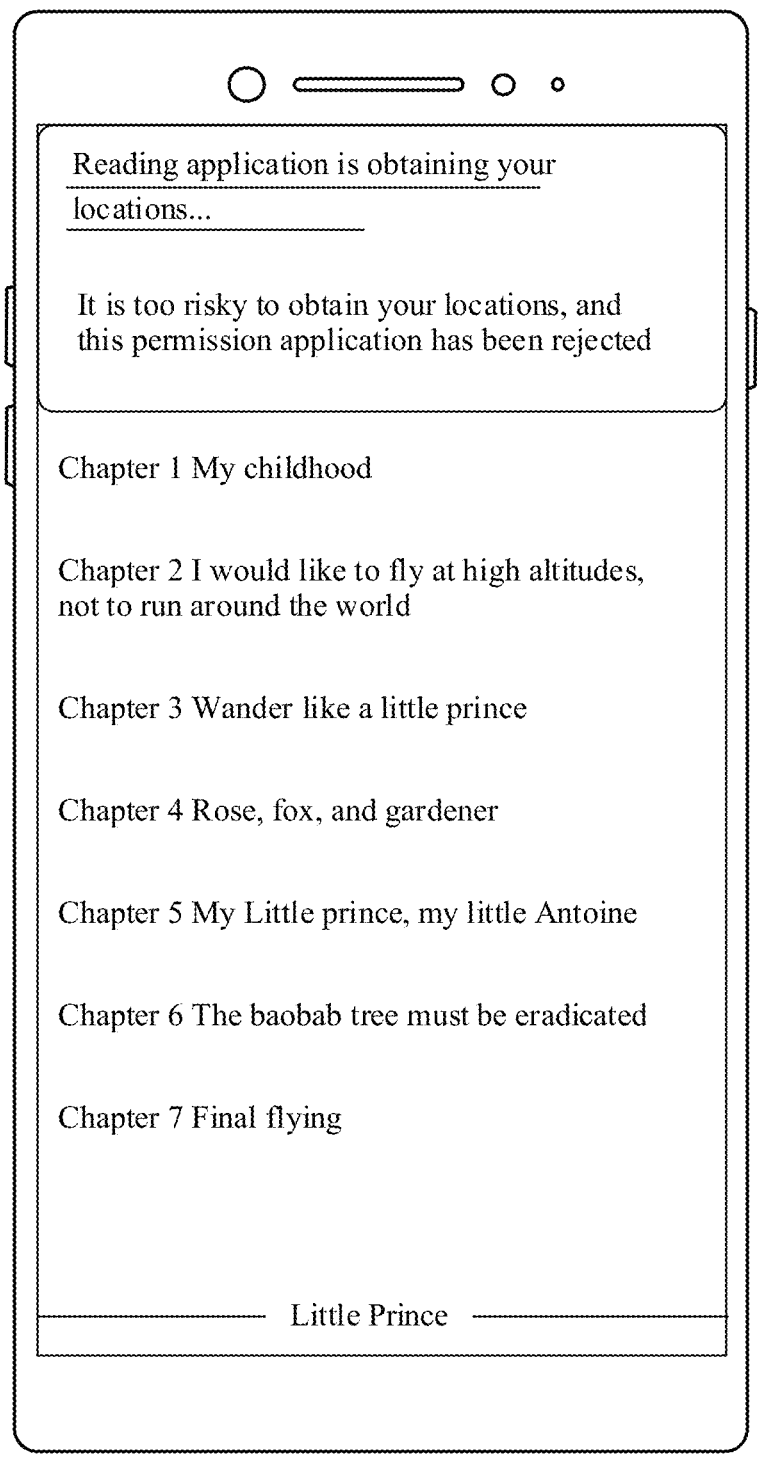
FIG. 12 is a schematic diagram 10 of an application scenario of a method for managing an application permission according to an embodiment of this application.

Using a reading application as an example, when the mobile phone runs the reading application, the mobile phone may periodically identify a current use scenario, and store a latest identified use scenario. If the permission service receives a request for obtaining location information from the reading application, as shown in FIG. 12, the permission service may obtain that a most recently identified use scenario is the reading scenario. Further, the permission service may query whether the use scenario whitelist corresponding to the application permission to obtain the location information includes the reading scenario in Table 2. If the use scenario whitelist corresponding to the application permission to obtain the location information does not include the reading scenario, it indicates that the operation of obtaining user location information in the reading scenario is an operation with a high security risk for the user. Therefore, the permission service may reject to grant, to the reading application, the application permission to obtain the location information.

For example, when the permission service rejects to grant, to the reading application, the application permission to obtain the location information, the permission service may return a permission grant response of PERMISSION_GRANTED to the reading application. In addition, the permission service may send indication information to a positioning service, to indicate the positioning service to provide fake location information to the reading application this time. In this way, after receiving the permission grant response, the reading application may continue to send a location request to the positioning service, to request the positioning service to report current location information of the user. Because the positioning service has received the indication information sent by the permission service, after receiving the location request sent by the reading application, the positioning service may report the fake location information to the reading application, instead of reporting current actual location information of the user to the reading application. For example, the positioning service may randomly generate location information of a longitude and a latitude, and report the location information to the reading application. For another example, the positioning service may obtain latitude and longitude information of any location (for example, the Arctic and the Antarctic) preset by the mobile phone, and further report the obtained latitude and longitude information to the reading application.

In this way, although the reading application obtains the application permission to use a location service in the reading scenario, the location information finally obtained by the reading application from the positioning service is not the actual location information of the user. This avoids that the reading application randomly obtains the location information of the user in an improper use scenario.

In some embodiments, when some applications apply to the permission service for using the application permission, if the permission grant response returned by the permission service is not obtained, the applications may encounter exceptions that affect use of the user, for example, an unexpected exit, stalling, or a crash. The applications may be referred to as applications of a specific type in a subsequent embodiment. In this case, if the permission service determines that the application permission requested by the reading application this time does not correspond to the current use scenario, the permission service may further obtain whether the reading application is an application of the specific type. If the reading application is the application of the specific type, the permission service may indicate, according to the foregoing method, a related service to provide corresponding fake data for the reading application.

The fake data means that when an application is granted by the permission service to request user data (for example, location information, contact information, or picture information) from a service (for example, a location service, a contact service, or a phone service), a corresponding service provides, to the application, virtual data that is inconsistent with the actual user data. For example, the fake data may be specifically fake location information, a fake international mobile equipment identity (international mobile equipment identity, IMEI), a fake serial number (serial number, SN), fake contact information, a fake photo, or the like. In this way, real data of the user is protected from being leaked by the foregoing application of the specific type, and a normal running process of the foregoing application of the specific type is not affected.

Figure 13A:
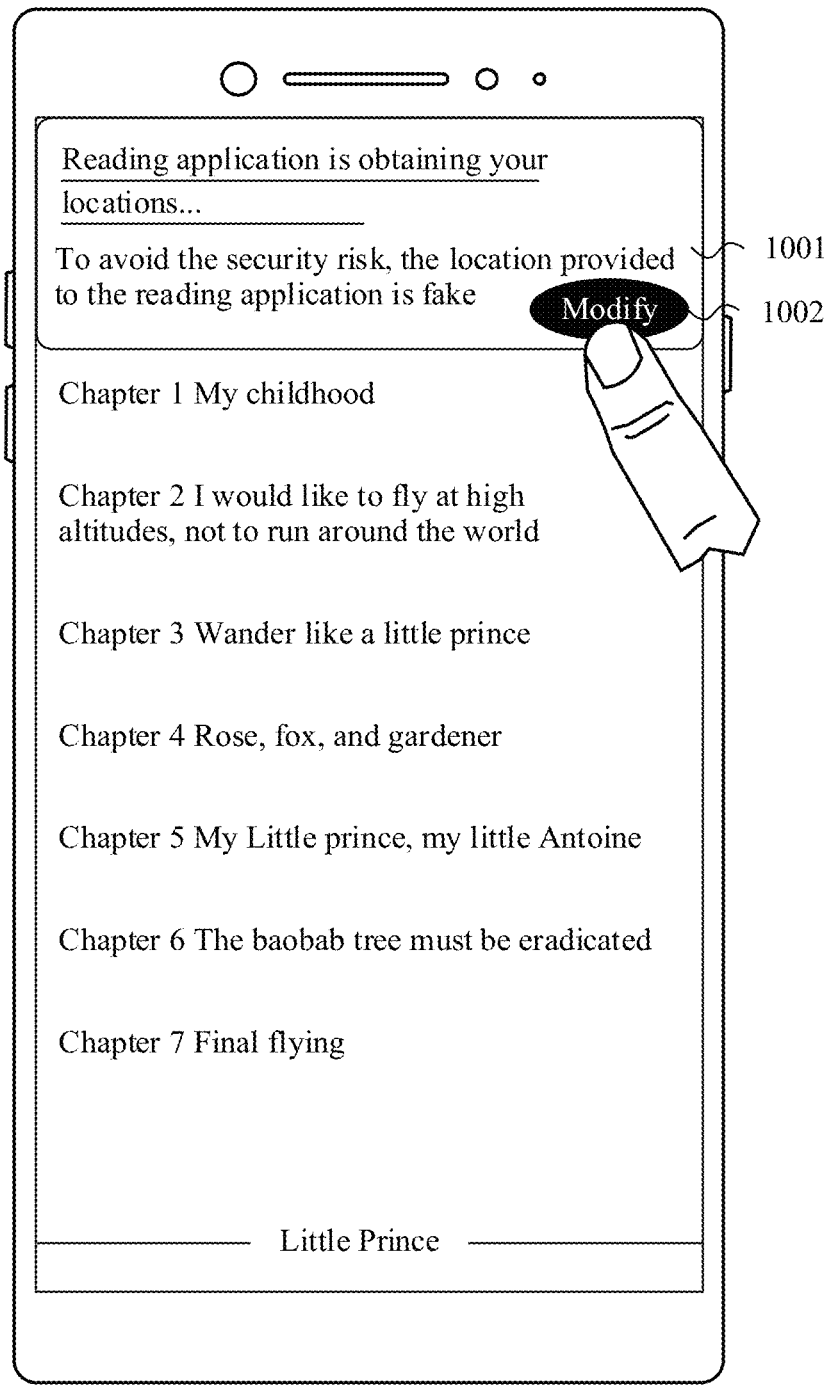
FIG. 13(a) and FIG. 13(b) are schematic diagrams 11 of an application scenario of a method for managing an application permission according to an embodiment of this application.

For example, if it is detected that, in the reading scenario, the reading application requests to obtain the location information from the permission service, the permission service may automatically indicate the positioning service to provide fake location information to the reading application this time. In this case, as shown in FIG. 13(a), the mobile phone may display a notification 1001, and the notification 1001 may prompt the user that the location information provided for the reading application this time is not the actual location information of the user.

Figure 13B:
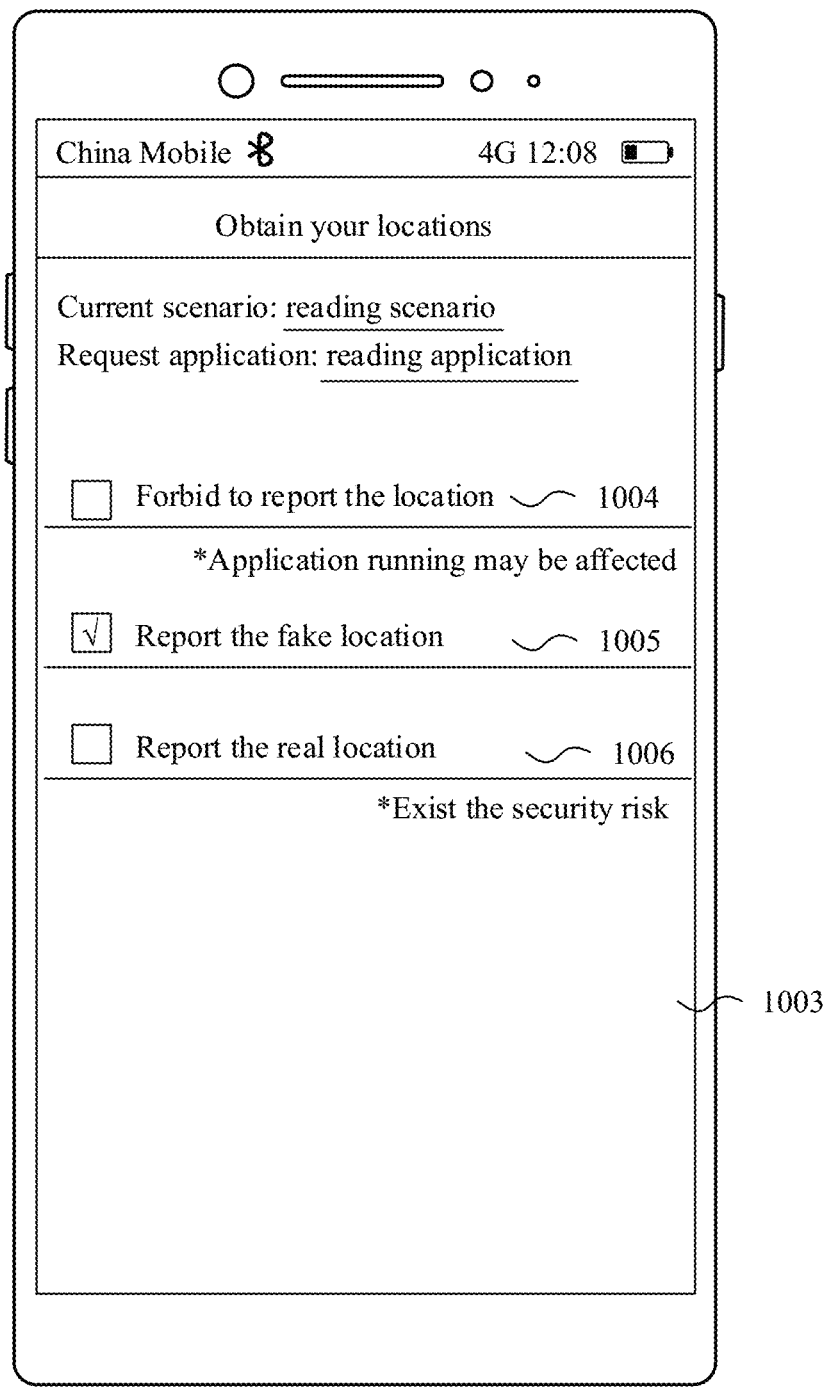

In addition, the mobile phone may further set a modify button 1002 in the notification 1001. If the mobile phone detects that the user selects the button 1002, as shown in FIG. 13(b), the mobile phone may jump to a management interface 1003 of the application permission to obtain the location information. In the management interface 1003, the user may manually modify a specific manner of reporting the location information to the reading application. For example, an option 1004 of forbidding reporting the location information to the reading application is set in the management interface 1003. If the reading application is the foregoing application of the specific type, the mobile phone may further prompt the user that after selecting the option 1004, the reading application may fail to run normally. For another example, an option 1005 of reporting fake location information to the reading application and an option 1006 of reporting real location information to the reading application may be further set in the management interface 1003. If the use scenario whitelist corresponding to the application permission to obtain the location information does not include the reading scenario, the mobile phone may further prompt the user to select the option 1006, which may increase a security risk of user privacy leakage.

Figure 14:
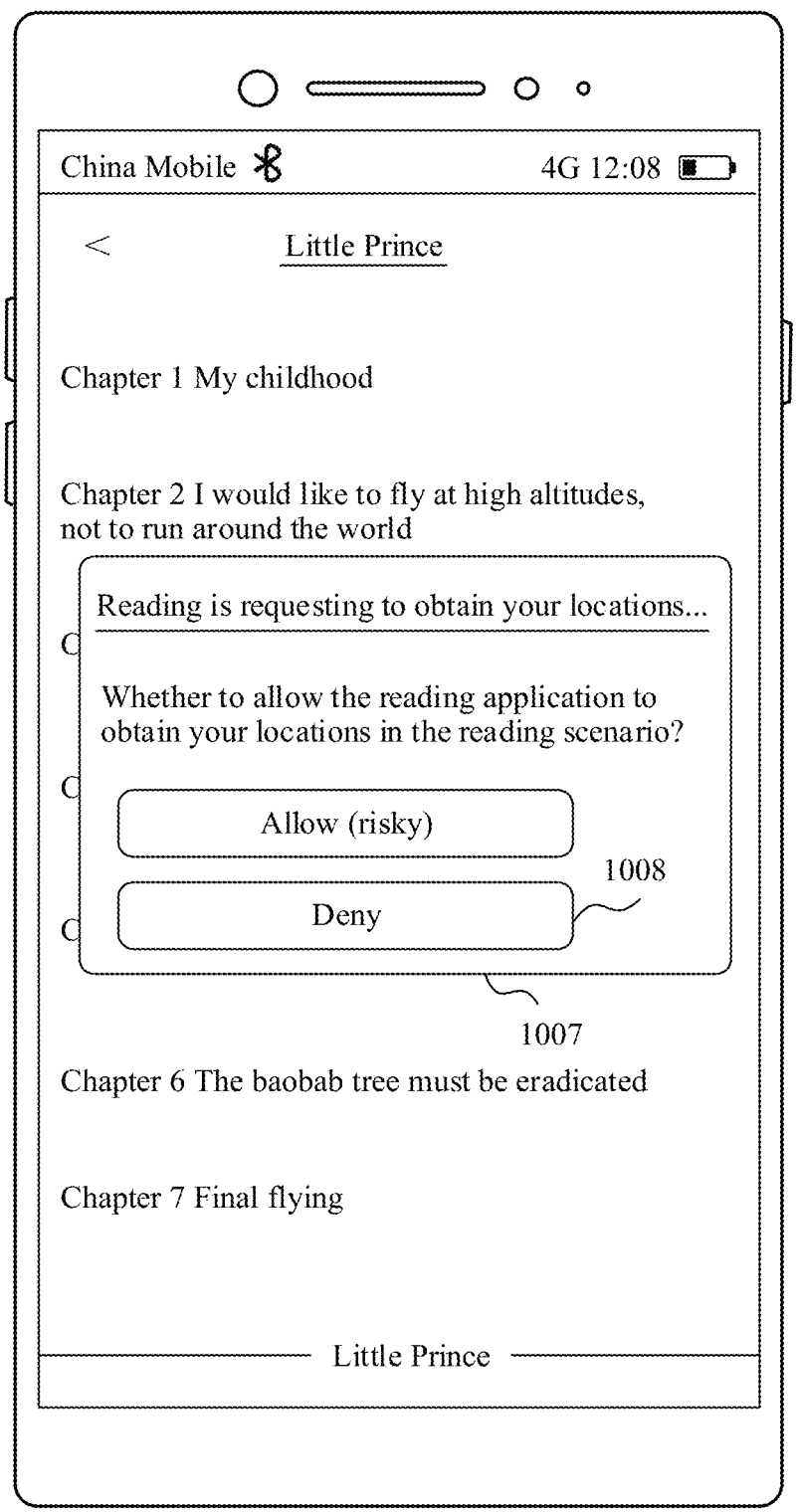
FIG. 14 is a schematic diagram 12 of an application scenario of a method for managing an application permission according to an embodiment of this application.

Alternatively, if the mobile phone detects that, in the reading scenario, the reading application requests to obtain the location information from the permission service, as shown in FIG. 14, the mobile phone may ask, in a prompt box 1007, the user whether to allow the reading application to obtain the location information this time. Because the reading application belongs to the foregoing application of the specific type, if it is detected that the user taps a "reject" button 1008, to avoid a phenomenon such as an unexpected exit, stalling, or a crash of the reading application, the permission service in the mobile phone may indicate, according to the foregoing method, the positioning service to provide the fake location information to the reading application, to protect the real location information of the user from being leaked by the reading application.

In some embodiments, an application list may be preset in the mobile phone, and all applications in the application list belong to the foregoing application of the specific type. The foregoing reading application is still used as an example. When the mobile phone detects that the application permission used by the reading application request does not correspond to the current use scenario, the mobile phone may determine, according to the foregoing application list, whether the reading application is the foregoing application of the specific type.

Alternatively, when some applications apply to the permission service for using an application permission of a specific type, if the permission grant response returned by the permission service is not obtained, the applications may encounter exceptions that affect use of the user, for example, an unexpected exit, stalling, or a crash. In this case, the application permission, of a specific type, that affects use of the user may be further set in the foregoing application list. For example, the application list includes an application A, and an application permission, of a specific type, corresponding to the application A includes an application permission 1 and an application permission 2. In this case, the foregoing reading application is still used as an example. When the mobile phone detects that the application permission requested to be used by the reading application does not correspond to the current use scenario, if the mobile phone finds that the foregoing application list records the reading application, and the application permission, of the specific type, corresponding to the reading application includes the application permission requested to be used by the reading application this time, the mobile phone may indicate, according to the foregoing method, a related service to provide corresponding fake data to the reading application.

In addition, the mobile phone may further update an application or an application permission recorded in the application list. For example, after the permission service rejects the permission application of an application B for using the application permission 3, if the mobile phone detects a phenomenon such as an unexpected exit, stalling, or a crash of the application B, the mobile phone may add the application B to the foregoing application list, and record, in the application list, that the application permission, of a specific type, corresponding to the application B includes the application permission 3. Certainly, the mobile phone may alternatively request the server to create or update the application list. This is not limited in this embodiment of this application.

It can be learned that in the method for managing an application permission provided in this embodiment of this application, the mobile phone controls, by using a use scenario as a granularity, an application to obtain a corresponding application permission in different use scenarios, to preventing the application from abusing an application permission to obtain user privacy after registering the application permission. This reduces a security risk of user privacy leakage, and improves user experience.

Because the mobile phone may control, based on a more granular use scenario, the application permission requested to be used by the application, in some embodiments, a process in which the application registers the application permission with the permission service in the mobile phone may be omitted. In other words, when the application is installed or run, one or more application permissions that need to be subsequently used do not need to be pre-registered in the permission service. Correspondingly, each time when the application needs to use an application permission, the permission service may allow or reject, the application based on a current use scenario, to use the application permission.

Figure 15:
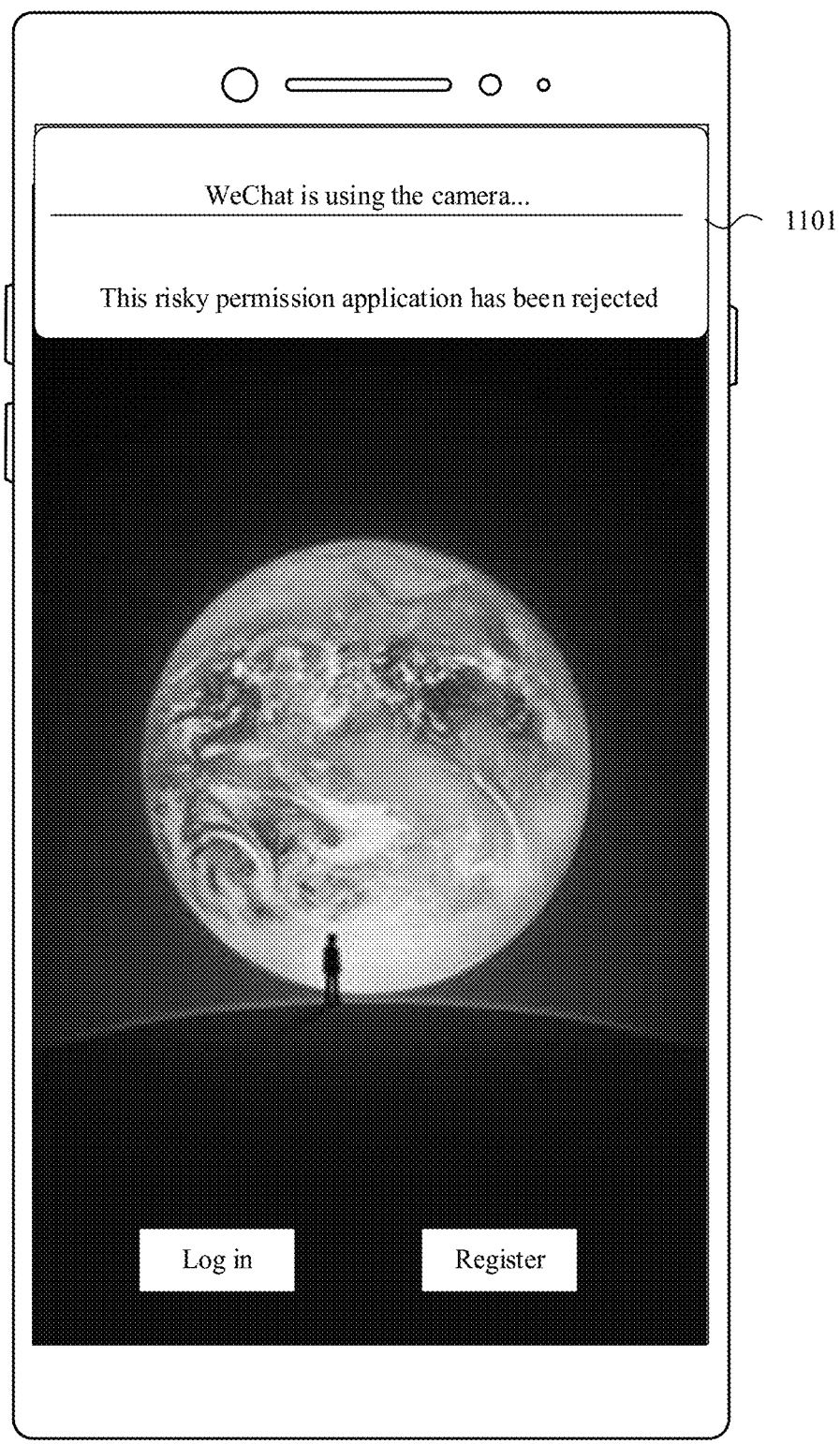
FIG. 15 is a schematic diagram 13 of an application scenario of a method for managing an application permission according to an embodiment of this application.

For example, the mobile phone may detect the current use scenario in real time, and a variable may be set in the mobile phone to store a specific use scenario detected most recently. The WeChat application is used as an example. When the WeChat application is installed, an application permission does not need to be granted to the WeChat application. As shown in FIG. 15, after detecting that a current scenario is a login scenario of the WeChat application, the mobile phone may save, in the foregoing variable, the current use scenario as a WeChat login scenario. Further, if the permission service receives a permission application that is sent by the WeChat application and that requests to use the camera, the permission service may query in Table 2 whether the use scenario whitelist corresponding to the application permission to use the camera includes a WeChat login scenario. If the use scenario whitelist corresponding to the application permission to use the camera does not include the WeChat login scenario, it indicates that using the camera in the WeChat login scenario may leak user privacy. Therefore, the permission service may reject to grant, to the WeChat application, the application permission to use the camera. In this case, still as shown in FIG. 15, the mobile phone may display a dialog box 1101 to prompt the user that the permission application to use the camera by WeChat this time has been rejected.

Figure 16A:
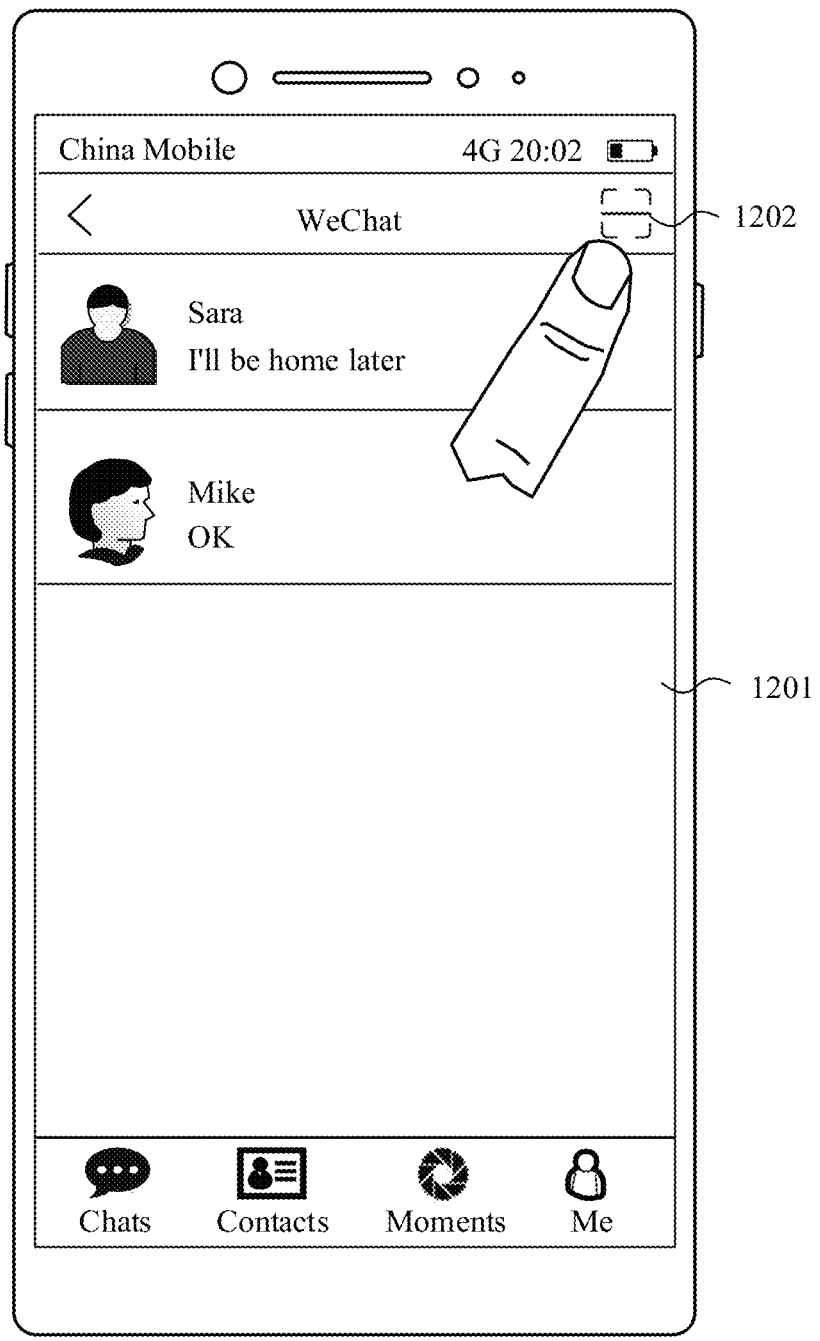
FIG. 16(a) and FIG. 16(b) are schematic diagrams 14 of an application scenario of a method for managing an application permission according to an embodiment of this application.
Figure 16B:
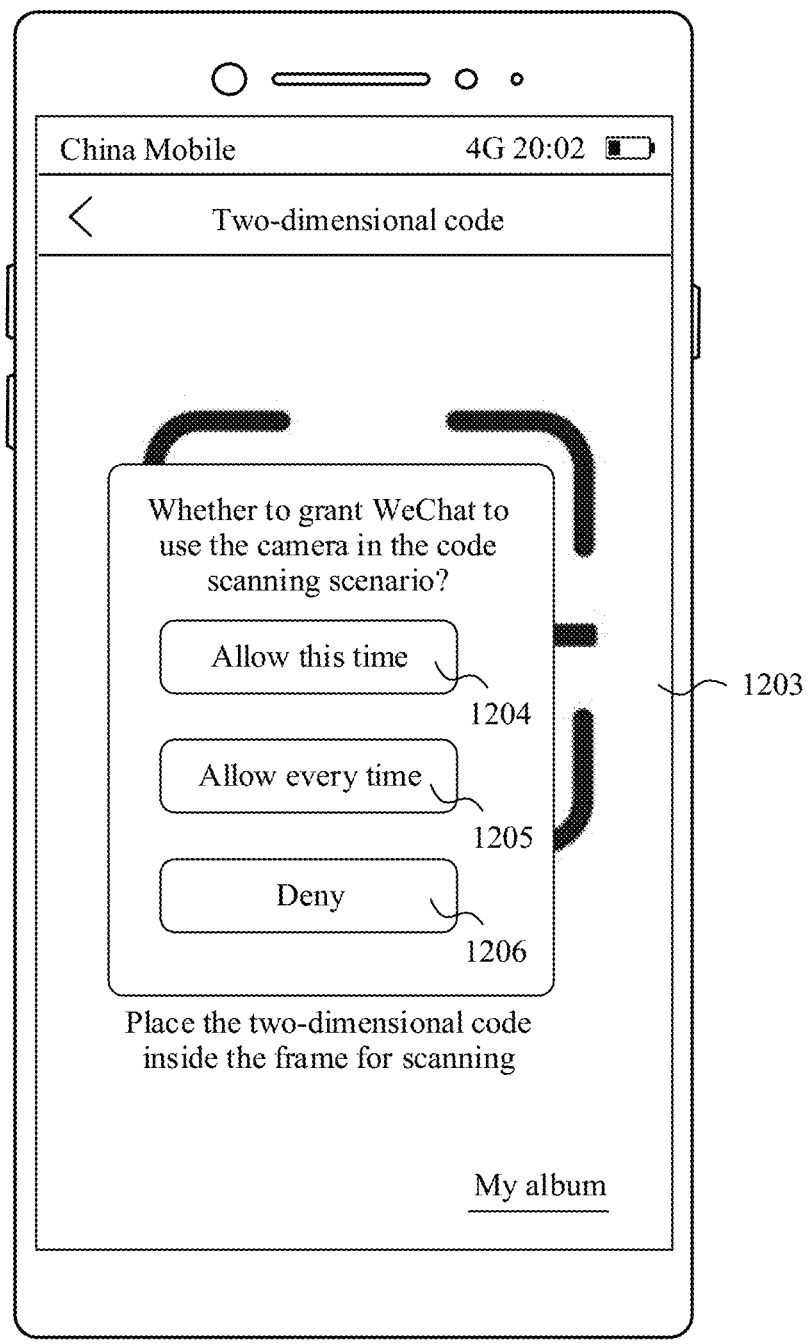

After successfully logging in to the WeChat application, as shown in FIG. 16(*a*), the mobile phone may display a display interface 1201 of the WeChat application, and the display interface 1201 includes a code scanning button 1202 used to scan a two-dimensional code. If the mobile phone detects that the user taps the code scanning button 1202, as shown in FIG. 16(*b*), the mobile phone may display a code scanning interface 1203 in the WeChat application. In this case, on one hand, the mobile phone may detect that the current use scenario is updated to the code scanning scenario. On the other hand, because a code scanning function of the WeChat application needs to use the camera to obtain two-dimensional code information, the WeChat application may request, from the permission service in the mobile phone, to grant, to the WeChat application, the application permission to use the camera this time. In this case, with reference to the current code scanning scenario, it may be determined, from the correspondence shown in Table 2, that using the camera in the code scanning scenario by the WeChat application this time is a proper permission application. Therefore, the permission service may automatically return a permission grant response of PERMISSION_GRANTED to the WeChat application. After receiving the permission grant response, the WeChat application may continue to invoke the camera service to open the camera to capture image information. In this way, the mobile phone can automatically grant an application to use a related application permission in a proper scenario with a relatively low security risk without being perceived by the user, to reduce a risk of user privacy leakage and improve user experience.

In some other embodiments, as shown in FIG. 16(*b*), after determining that it is a proper permission application for the WeChat application to use the camera in the code scanning scenario this time, the mobile phone may further display a dialog box 1204 on the code scanning interface 1203, in the dialog box 1204, prompt the user that the WeChat application is using the camera function in the code scanning scenario, and ask the user whether to allow the WeChat application to use the camera function. If it is detected that the user selects an "allow this time" button 1205, it indicates that the user grants the WeChat application to use the camera permission in the code scanning scenario only this time. Therefore, the permission service may respond to a selection of the user to grant the WeChat application to use the camera. Subsequently, if the mobile phone detects again in the code scanning scenario that the WeChat application applies for using the camera, the mobile phone may continue to display the dialog box 1204 to prompt the user to grant the WeChat application to use the camera.

Alternatively, when displaying the dialog box 1204, the mobile phone may further set an "allow each time" button 1205. Because the scenario whitelist for using the camera includes the code scanning scenario, it indicates that granting the application to use the camera in the code scanning scenario usually does not leak user privacy. Therefore, the mobile phone may recommend the user to select the "allow every time" button 1205, to be specific, allow the WeChat application to use the camera in the code scanning scenario each time. In this case, if it is detected that the user selects the "allow every time" button 1205, it indicates that the user grants, to the WeChat application, the application permission to use the camera each time in the code scanning scenario. Further, the permission service may grant, in response to the selection of the user, the WeChat application to use the camera. In addition, if it is subsequently detected, in the code scanning scenario, that the WeChat application applies for using the camera, the mobile phone may automatically grant, to the WeChat application, the application permission to use the camera, and no longer display the dialog box 1204.

Alternatively, when displaying the dialog box 1204, the mobile phone may further set a "reject to grant" button 1206. If the mobile phone detects that the "reject to grant" button 1206 is tapped, the mobile phone may prompt the user that the code scanning function cannot be completed. If the user still rejects to grant the WeChat application to use the camera in the code scanning scenario, the mobile phone may reject to grant the WeChat application to use the camera.

Figure 17A:
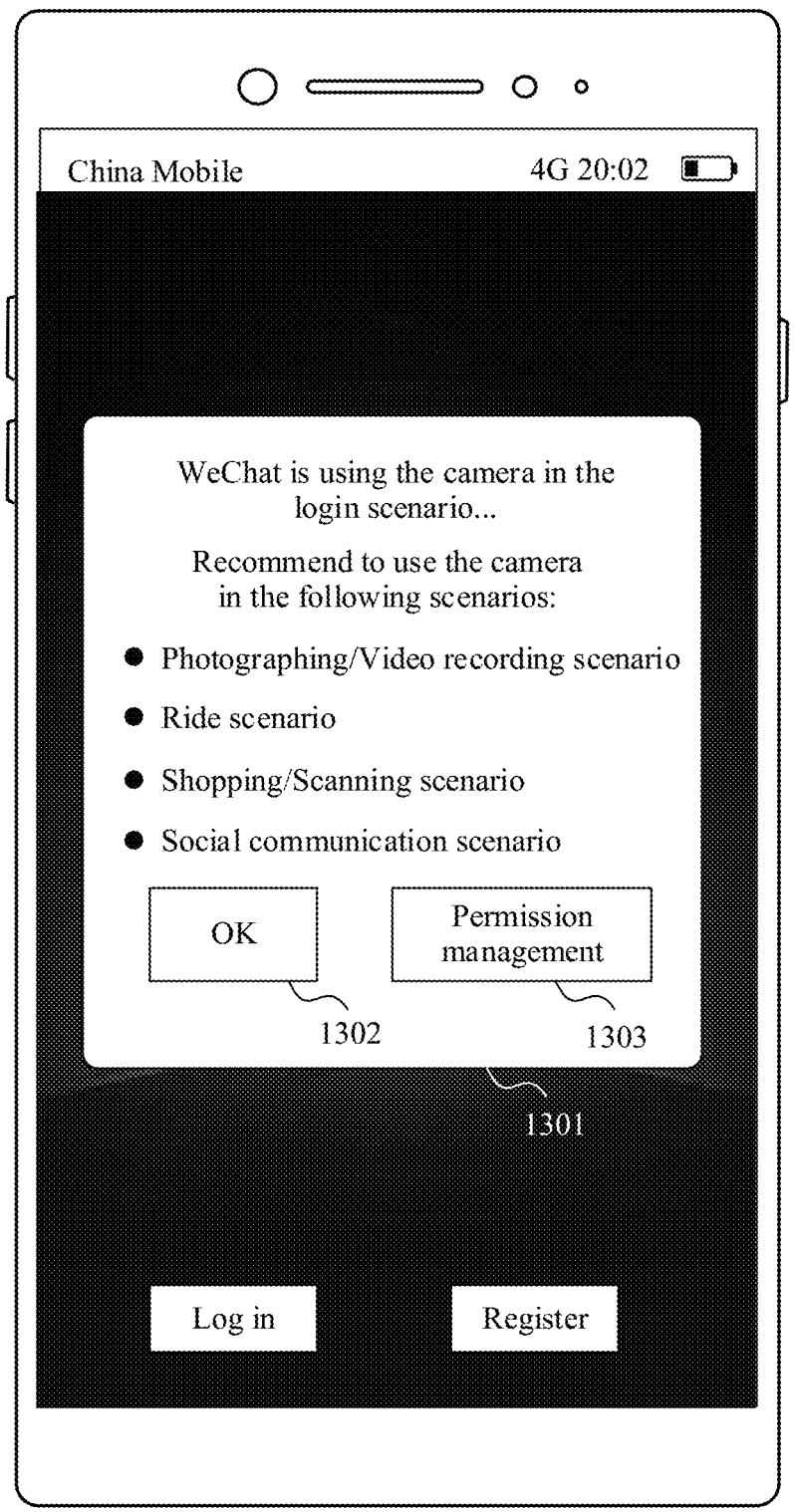
FIG. 17(a) and FIG. 17(b) are schematic diagrams 15 of an application scenario of a method for managing an application permission according to an embodiment of this application.
Figure 17B:
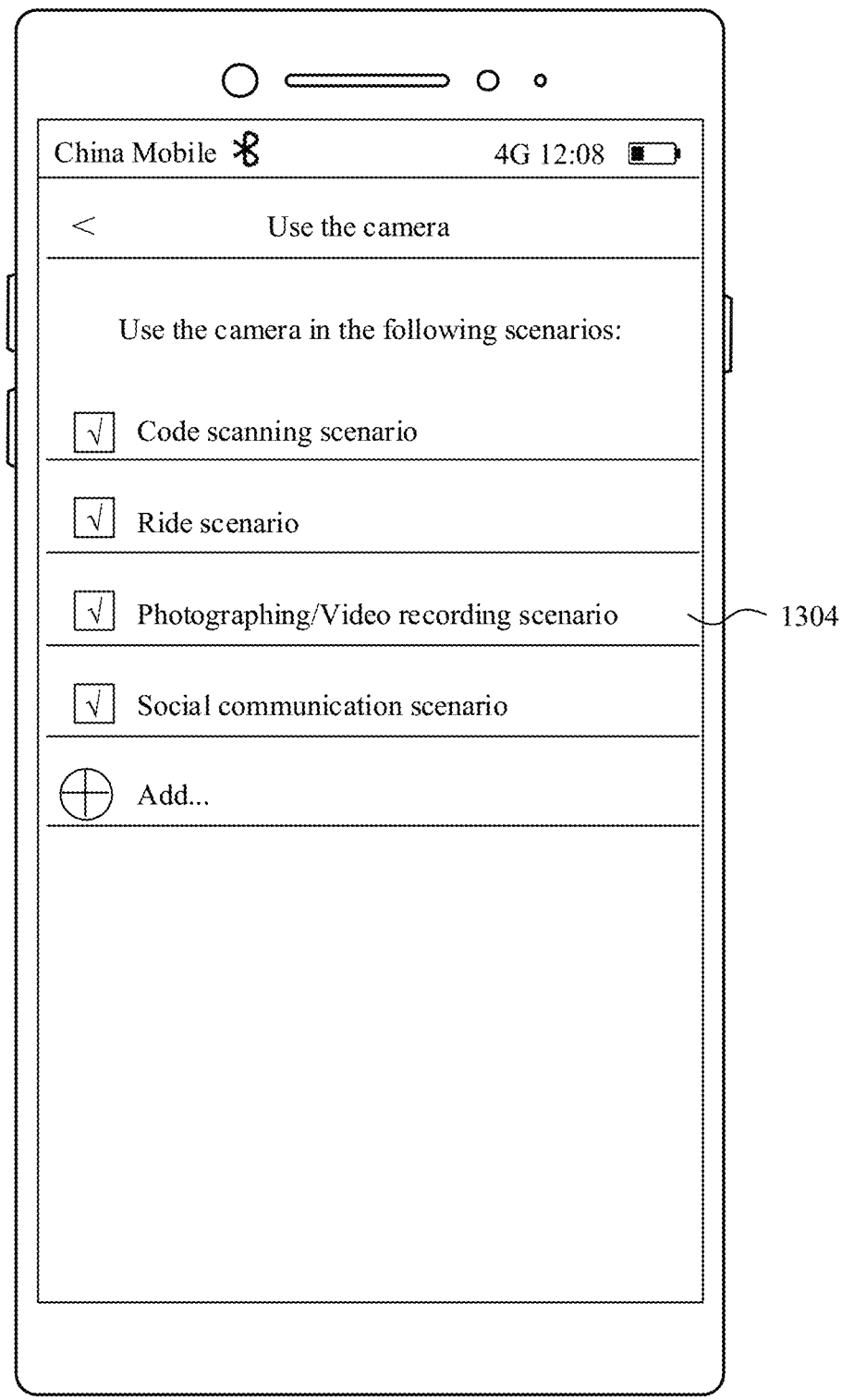

In some other embodiments, the WeChat application is still used as an example. When the mobile phone allows/rejects the WeChat application to use an application permission, the mobile phone may further prompt the user with specific use scenarios in which the WeChat application is allowed to use the application permission. For example, as shown in FIG. 17(a), if it is detected for the first time in the WeChat login scenario that the WeChat application request the permission service to grant the application permission to use the camera, the mobile phone may display a dialog box 1301. In the dialog box 1301, the mobile phone may present, to the user, one or more use scenarios in which the WeChat application is allowed to use the camera permission, namely, use scenarios in the use scenario whitelist corresponding to the application permission to use the camera. If it is detected that the user taps an OK button 1302, it indicates that the user has confirmed that the WeChat application is granted to use the camera in the use scenario shown in the dialog box 1301, but the current WeChat login scenario is not in the foregoing use scenario. Therefore, the mobile phone may reject to grant, to the WeChat application, the application permission to use the camera. If the mobile phone detects that the user taps a permission management button 1303, as shown in FIG. 17(b), the mobile phone may jump to an application permission management interface 1304 for using the camera. In the management interface 1304, the user may manually add a specific use scenario in which the application is granted to use the camera, or may disable a currently granted use scenario in which the application is allowed to use the camera. This is not limited in this embodiment of this application.

Figure 18:
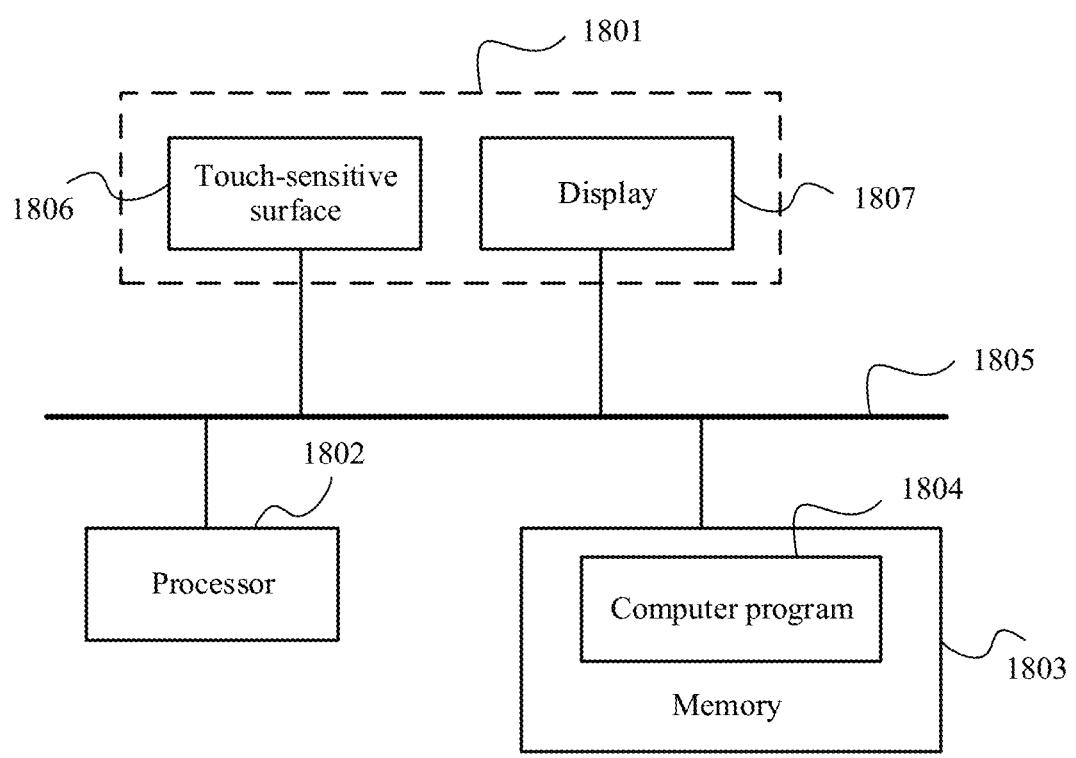
FIG. 18 is a schematic structural diagram 2 of an electronic device according to an embodiment of this application.

As shown in FIG. 18, an embodiment of this application discloses an electronic device, including a touchscreen 1801. The touchscreen 1801 includes a touch-sensitive surface 1806, a display 1807, one or more processors 1802, a memory 1803, one or more application programs (not shown), and one or more computer programs 1804. The foregoing components may be connected through one or more communications buses 1805. The one or more computer programs 1804 are stored in the memory 1803 and are configured to be executed by the one or more processors 1802. The one or more computer programs 1804 include instructions, and the instructions may be used to perform the steps in the foregoing embodiments.

For example, the processor 1802 may be specifically the processor 110 shown in FIG. 1, the memory 1803 may be specifically the internal memory 121 or the external memory 120 shown in FIG. 1, the display 1807 may be specifically the display 194 shown in FIG. 1, and the touch-sensitive surface 1806 may be specifically the touch sensor 180K in the sensor module 180 shown in FIG. 1.

The foregoing descriptions about implementations allow a person skilled in the art to clearly understand that, for the purpose of convenient and brief description, division into only the foregoing functional modules is used as an example for description. In an actual application, the foregoing functions can be allocated to different functional modules for implementation based on a requirement. In other words, an inner structure of an apparatus is divided into different functional modules to implement all or some of the functions described above. For a detailed working process of the foregoing system, apparatus, and unit, refer to a corresponding process in the foregoing method embodiments, and details are not described herein again.

Function units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or a compact disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method for managing an application permission, implemented by an electronic device, wherein the method comprises:
   displaying a home screen, wherein the home screen comprises an icon of a first application;
   displaying a first interface in response to a first operation from a user on the icon;
   detecting, in the first interface, a first use scenario that depends on a first function of the first application;
   allowing the first application to use a first application permission when displaying the first interface, wherein the first application permission is pre-authorized for the first application and enables the first function;
   displaying a second interface in response to a second operation from the user on the first interface;
   detecting, in the second interface, a second use scenario that depends on a second function of the first application; and
   rejecting the first application from using the first application permission when displaying the second interface, wherein the first application permission that is pre-authorized for the first application and that enables the first function does not affect the second function.

2. The method of claim 1, wherein the first interface indicates the first use scenario and the second interface indicates the second use scenario, and wherein the method further comprises:
   allowing the first application to use the first application permission when the first application permission corresponds to the first use scenario; and
   rejecting the first application from using the first application permission when the first application permission does not correspond to the second use scenario.

3. The method of claim 1, wherein when rejecting the first application from using the first application permission, the method further comprises displaying a first notification in the second interface, wherein the first notification prompts the user that a request for using the first application permission by the first application is rejected.

4. The method of claim 3, wherein the first notification comprises a use scenario corresponding to the second interface.

5. The method of claim 3, wherein after displaying the first notification in the second interface, the method further comprises:
detecting whether the user opens the first notification; and
displaying a settings interface for managing the first application permission when the user opens the first notification.

6. The method of claim 1, wherein when displaying the second interface, the method further comprises:
detecting whether the first application requests to use the first application permission;
displaying a dialog box in the second interface when the first application requests to use the first application permission, wherein the dialog box comprises a first button that does not allow the first application to use the first application permission;
detecting whether the user selects the first button; and
rejecting the first application from using the first application permission when the user selects the first button.

7. The method of claim 6, wherein the dialog box further comprises prompt information, and wherein the prompt information prompts the user with a security risk of allowing the first application to use the first application permission.

8. The method of claim 6, wherein the dialog box further comprises a second button that allows the first application to use the first application permission, wherein after displaying the dialog box in the second interface, the method further comprises:
detecting whether the user selects the second button; and
providing, when the user selects the second button, fake data to the first application when the first application uses the first application permission.

9. The method of claim 1, further comprising sending, by a permission service of the electronic device, a permission rejection response to the first application indicating that the first application cannot use the first application permission.

10. The method of claim 1, wherein the first application permission comprises a first permission to obtain location information, a second permission to read or modify an address book, a third permission to read or modify a calendar, a fourth permission to use a camera, a fifth permission to use a microphone, a sixth permission to use BLUETOOTH, or a seventh permission to use a voice recognition function.

11. An electronic device, comprising:
a processor; and
a non-transitory memory coupled to the processor and configured to store instructions that, when executed by the processor, cause the electronic device to be configured to:
display a home screen, wherein the home screen comprises an icon of a first application;
display a first interface in response to a first operation from a user on the icon;
detect, in the first interface, a first use scenario that depends on a first function of the first application;
allow the first application to use a first application permission when displaying the first interface, wherein the first application permission is pre-authorized for the first application and enables the first function;
display a second interface in response to a second operation from the user on the first interface;
detect, in the second interface, a second use scenario that depends on a second function of the first application; and
reject the first application from using the first application permission when displaying the second interface, wherein the first application permission that is pre-authorized for the first application and that enables the first function does not affect the second function.

12. The electronic device of claim 11, wherein the first interface indicates a first use scenario and the second interface indicates the second use scenario and wherein the instructions further cause the electronic device to be configured to:
allow the first application to use the first application permission when the first application permission corresponds to the first use scenario; and
reject the first application to use the first application permission when the first application permission does not correspond to the second use scenario.

13. The electronic device of claim 11, wherein when the electronic device is configured to reject the first application from using the first application permission, the instructions further cause the electronic device to be configured to display a first notification in the second interface, wherein the first notification prompts the user that a request for using the first application permission by the first application is rejected.

14. The electronic device of claim 13, wherein after the instructions cause the electronic device to display the first notification in the second interface, the instructions further cause the electronic device to be configured to:
detect whether the user opens the first notification; and
display a settings interface for managing the first application permission when the user opens the first notification.

15. The electronic device of claim 11, wherein when the instructions cause the electronic device to display the second interface, the instructions further cause the electronic device to be configured to:
detect whether the first application requests to use the first application permission;
display a dialog box in the second interface when the first application requests to use the first application permission, wherein the dialog box comprises a first button that does not allow the first application to use the first application permission;
detect whether the user selects the first button; and
reject the first application from using the first application permission when the user selects the first button.

16. The electronic device of claim 15, wherein the dialog box further comprises prompt information, and wherein the prompt information prompts the user with a security risk of allowing the first application to use the first application permission.

17. The electronic device of claim 15, wherein the dialog box further comprises a second button that allows the first application to use the first application permission, wherein after the instructions cause the electronic device to display the dialog box in the second interface, the instructions further cause the electronic device to be configured to:
detect whether the user selects the second button; and
provide, when the user selects the second button, fake data to the first application when the first application uses the first application permission.

18. The electronic device of claim 11, wherein the instructions further cause the electronic device to be configured to send, by a permission service of the electronic device, a permission rejection response to the first application indicating that the first application cannot use the first application permission.

19. The electronic device of claim 11, wherein the first application permission comprises a first permission to obtain location information, a second permission to read or modify an address book, a third permission to read or modify a calendar, a fourth permission to use a camera, a fifth permission to use a microphone, a sixth permission to use BLUETOOTH, or a seventh permission to use a voice recognition function.

20. A computer program product comprising instructions that are stored on a non-transitory computer-readable medium and that, when executed by a processor, cause an electronic device to:

display a home screen, wherein the home screen comprises an icon of a first application;

display a first interface in response to a first operation from a user on the icon;

detect, in the first interface, a first use scenario that depends on a first function of the first application;

allow the first application to use a first application permission when displaying the first interface, wherein the first application permission is pre-authorized for the first application and enables the first function;

display a second interface in response to a second operation from the user on the first interface;

detect, in the second interface, a second use scenario that depends on a second function of the first application; and reject the first application from using the first application permission when displaying the second interface, wherein the first application permission that is pre-authorized for the first application and that enables the first function does not affect the second function.

* * * * *